United States Patent
Imran et al.

(10) Patent No.: US 10,979,932 B2
(45) Date of Patent: Apr. 13, 2021

(54) ENHANCEMENT OF CAPACITY AND USER QUALITY OF SERVICE (QOS) IN MOBILE CELLULAR NETWORKS

(71) Applicant: The Board of Regents of the University of Oklahoma, Norman, OK (US)

(72) Inventors: Ali Imran, Bixby, OK (US); Ahmad Asghar, Seattle, WA (US); Hasan Farooq, Tulsa, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 0 days.

(21) Appl. No.: 16/607,026

(22) PCT Filed: Jun. 6, 2019

(86) PCT No.: PCT/US2019/035816
§ 371 (c)(1),
(2) Date: Oct. 21, 2019

(87) PCT Pub. No.: WO2019/236865
PCT Pub. Date: Dec. 12, 2019

(65) Prior Publication Data
US 2020/0314683 A1    Oct. 1, 2020

Related U.S. Application Data
(60) Provisional application No. 62/681,320, filed on Jun. 6, 2018.

(51) Int. Cl.
*H04W 28/02* (2009.01)
*H04W 76/15* (2018.01)
(Continued)

(52) U.S. Cl.
CPC ... *H04W 28/0263* (2013.01); *H04W 28/0268* (2013.01); *H04W 76/11* (2018.02);
(Continued)

(58) Field of Classification Search
CPC . H04W 52/386; H04W 16/22; H04W 52/267; H04B 17/382; H04L 5/0037
See application file for complete search history.

(56) References Cited

U.S. PATENT DOCUMENTS

| | | | |
|---|---|---|---|
| 2003/0169201 A1* | 9/2003 | Dybdal | H01Q 1/1257 342/367 |
| 2009/0274086 A1 | 11/2009 | Petrovic et al. | |

(Continued)

OTHER PUBLICATIONS

Fehske, Albrecht J., et al.; "Concurrent Load-Aware Adjustment of User Association and Antenna Tilts in Self-Organizing Radio Networks"; IEEE Transactions on Vehicular Technology; vol. 62, No. 5; Jun. 2013; 15 pages.

(Continued)

*Primary Examiner* — Syed Ali
(74) *Attorney, Agent, or Firm* — Conley Rose, P.C.

(57) ABSTRACT

A method comprises operating in an idle user state; determining to exit the idle user state and enter an active user state; obtaining cell loads of cells; calculating association functions based on the cell loads; determining, from among the association functions, a first association function with a maximum value; selecting a first cell associated with the first association function as a target cell; and entering the active user state by connecting to the first cell.

15 Claims, 18 Drawing Sheets

(51) Int. Cl.
*H04W 76/11* (2018.01)
*H04W 76/27* (2018.01)
*H04W 84/18* (2009.01)

(52) U.S. Cl.
CPC ........... *H04W 76/15* (2018.02); *H04W 76/27* (2018.02); *H04W 84/18* (2013.01)

(56) References Cited

U.S. PATENT DOCUMENTS

| | | | |
|---|---|---|---|
| 2013/0021204 A1* | 1/2013 | Walker | H04W 16/28 342/372 |
| 2013/0084864 A1 | 4/2013 | Agrawal et al. | |
| 2013/0170362 A1 | 7/2013 | Futaki et al. | |
| 2013/0252620 A1 | 9/2013 | Kobayashi et al. | |
| 2014/0198659 A1* | 7/2014 | Vargas Bautista | H04W 28/08 370/236 |
| 2014/0226481 A1 | 8/2014 | Dahod et al. | |
| 2014/0256335 A1* | 9/2014 | Kobayashi | H04W 52/386 455/450 |
| 2014/0341039 A1 | 11/2014 | Rubin et al. | |
| 2015/0043386 A1* | 2/2015 | Racz | H04L 41/0823 370/255 |
| 2015/0249950 A1* | 9/2015 | Teyeb | H04W 28/08 455/437 |
| 2016/0037550 A1 | 2/2016 | Barabell et al. | |
| 2016/0157240 A1* | 6/2016 | Dribinski | H04L 41/0823 370/329 |
| 2016/0302131 A1* | 10/2016 | Munier | H04W 36/385 |
| 2016/0353290 A1* | 12/2016 | Nammi | H04L 5/0073 |
| 2017/0201909 A1 | 7/2017 | Kobayashi et al. | |
| 2019/0140908 A1* | 5/2019 | Ma | H04L 41/12 |
| 2019/0273662 A1* | 9/2019 | Mwanje | H04L 41/16 |

OTHER PUBLICATIONS

Imran, Ali, et al.; "Challenges in 5G: How to Empower SON with Big Data for Enabling 5G"; IEEE Network; Nov./Dec. 2014; 7 pages.

Imran, Ali, et al.; "Self Organization of Tilts in Relay Enhanced Networks: A Distributed Solution"; IEEE Transaction on Wireless Communications; vol. 13, No. 2; Feb. 27, 2014; 16 pages.

Haupt, Randy L., et al.; "Practical Genetic Algorithms"; Second Edition; Wiley-Interscience; 2004; 261 pages.

Wright, Stephen J.; "Coordinate Descent Algorithms"; Mathematical Programming; vol. 151, Issue 1; Mar. 25, 2015; 32 pages.

PCT International Search Report; Application No. PCT/US2019/035816; dated Aug. 19, 2019; 3 pages.

PCT Written Opinion of the International Searching Authority; Application No. PCT/US2019/035816; dated Aug. 19, 2019; 4 pages.

* cited by examiner

Algorithm 1 Objective Function (14) Implementation Routine

Input: $P_t^c$, $\psi_{tilt}^c$, $P_{CIO}^c$

Output: $\Omega (P_t^c, \psi_{tilt}^c, P_{CIO}^c)$ (14a) or (14b)

1: for $u \in U$ do
2:  Find serving cell $j$ = arg max$_{\forall c \in C} \left( \dot{P}_{r,u_{dBm}}^c \right)$
3:  Calculate SINR $\hat{\gamma}_u^j$ and $\eta_u^j$
4: end for
5: for $c \in C$ do Calculate cell load $\eta_c$
6: end for
7: for $u \in U$ do
8:  Find new serving cell $j$ =
   arg max$_{\forall c \in C} \left( \left( \frac{1}{\eta_c} \right)^\alpha * \left( \dot{P}_{r,u_{dBm}}^c \right)^{(1-\alpha)} \right)$
9:  Find updated SINR $\gamma_u^j$ and $\eta_u^j$
10: end for
11: for $c \in C$ do Calculate cell load $\eta_c$
12: end for
13: if $\frac{1}{|C|} \sum_C \frac{1}{|U_c|} \sum_{U_c} 1 \left( P_{r,u}^c \geq P_{th}^c \right) \geq \varpi$ then
14:  if $\eta_c \leq \eta_{th}^c \ \forall c \in C$ then
15:   if $\hat{U}_c = U_c$ then
16:    Calculate $\Omega (P_t^c, \psi_{tilt}^c, P_{CIO}^c)$
17:   end if
18:  end if
19: else
20:  $\Omega (P_t^c, \psi_{tilt}^c, P_{CIO}^c) = -\infty$
21: end if

FIG. 3

Algorithm 2 Genetic Algorithm for CLASS Implementation

Input:
  Algorithm 1 to solve (14)
  Parameter set space $S(P_t^C, \psi_{tilt}^C, P_{CIO}^C)$,
  Maximum iterations G,
  Solution space samples per iteration P,
  Key samples per iteration E,
  Mutation ratio M.

Output:
  Solution $X = [P_t^C, \psi_{tilt}^C, P_{CIO}^C]$

---

1: Generate |P| parameter sets from S randomly;
2: Generate values of $\Omega$ for each set in P
3: Create an empty set Pop and save the sets from P in it;
4: for i = 1 to G do
5:   Number of elite members in Pop $num_{elite} = E$;
6:   Select the best $num_{elite}$ sets in Pop in terms of the value of $\Omega$ and save them in Pop$_1$;
7:   Number of crossover solutions $num_{crossover} = (|P| * num_{elite})/2$;
8:   for j = 1 to $num_{crossover}$ do
9:     Randomly select 2 parameter sets $X_1$ and $X_2$ from Pop;
10:    Generate $X_3$ and $X_4$ by one-point crossover to $X_1$ and $X_2$;
11:    Save $X_3$ and $X_4$ to Pop$_2$;
12:   end for
13:   for j = 1 to $num_{crossover}$ do
14:    Select a parameter set $X_j$ from Pop$_2$;
15:    Mutate each element of $X_j$ at a rate M and generate new solution $X_j'$;
16:    if $X_j'$ is non-feasible then Update $X_j'$ with a feasible solution by repairing $X_j'$;
17:    end if
18:    Update $X_j$ with $X_j'$ in Pop$_2$;
19:   end for
20:   Update Pop = Pop$_1$ + Pop$_2$;
19: end for
20: Return the set X which has the best value of $\Omega$ in Pop;

FIG. 4

Algorithm 3 Pattern Search Algorithm for CLASS Implementation

Input:
    Algorithm 1 to solve (14)

Parameter set space $S(P_t^C, \psi_{tilt}^C, P_{CIO}^C)$,

Output:
    Solution $X = [P_t^C, \psi_{tilt}^C, P_{CIO}^C]$

1: $k = 0$;
2: while $k <$ *iteration*$_{max}$ do
3:     Determine a step size $s_k$ using exploratory search algorithm;
4:     Test $\Omega$ at parameter set $x_0$ and two more points $x_1$ and $x_2$ in a triangle;
5:     Label best, good and worst points as $x_B$, $x_G$ and $x_W$;
6:     Reflect $x_W$ on the plane as $x_R$;
7:     if $\Omega(x_R) > \Omega(x_G)$ then
8:         if $\Omega(x_R) > \Omega(x_B)$ then replace $x_W$ with $x_R$;
9:         else Find $x_E|2x_R - (x_B + x_G)/2$, find $\Omega(x_E)$
10:            if $\Omega(x_E) > \Omega(x_B)$ then replace $x_W$ with $x_E$;
11:         end if
12:     end if
13:     else
14:         if $\Omega(x_R) < \Omega(x_W)$ then replace $x_W$ with $x_R$;
15:         Compute $x_C = ((x_B + x_G)/2) + x_R)/2$, find $\Omega(x_C)$
16:         else Compute $x_C = ((x_B + x_G)/2) + x_R)/2$, find $\Omega(x_C)$
17:         end if
18:         if $\Omega(x_C) < \Omega(x_W)$ then replace $x_W$ with $x_C$;
19:         else Compute $x_S = ((x_B + x_W)/2$ and replace $x_W$ with $x_S$ and $x_G = (x_B + x_G)/2)$
20:         end if
21:     end if
22:     Compute $p_k = \Omega(x_k) - \Omega(x_k + s_k)$
23:     if $p_k > 0$ then $x_{k+1} = x_k + s_k$
24:     else $x_{k+1} = x_k$
25:     end if
26:     Update pattern vectors and step size $k = k + 1$
27: end while
28: Return $X = [P_t^C, \psi_{tilt}^C, P_{CIO}^C]$

FIG. 5

ENHANCEMENT OF CAPACITY AND USER QUALITY OF SERVICE (QOS) IN MOBILE CELLULAR NETWORKS

CROSS-REFERENCE TO RELATED APPLICATIONS

This application is a national stage application of International Patent Application No. PCT/US2019/035816 filed on Jun. 6, 2019 by The Board of Regents of the University of Oklahoma, which claims priority to U.S. provisional patent application No. 62/681,320 filed on Jun. 6, 2018 by Ali Imran, et al., which are incorporated by reference.

STATEMENT REGARDING FEDERALLY SPONSORED RESEARCH OR DEVELOPMENT

This invention was made with government support under Grant Numbers 1619346 and 1559483 awarded by the National Science Foundation. The government has certain rights in the invention.

BACKGROUND

Ultra-dense Heterogeneous networks (HetNets) are emerging as an inevitable approach to tackle the capacity crunch in cellular networks. Despite recent advancements in many physical layer techniques and possible exploitation of new spectrum at higher frequencies, network densification remains the most yielding means to meet capacity demands of future 5G cellular networks. Densification, in one form or another, has also emerged as the most prolific defense against the energy and spectral efficiency challenges that plague modern cellular networks. However, network densification is not without limitations itself. One of the biggest challenges facing dense HetNets is the imbalance of load between macro cells and small cells. This load imbalance mainly stems from received power disparity between macro cells and small cells and causes poor utilization of system capacity.

Available cellular systems rely on a reference signal received power (RSRP)-based cell association mechanism, wherein a cell phone user individually selects for use the cell with a highest available RSRP. A major problem with this method is that it does not consider several key factors that determine the overall performance of the network. These factors include, for example, (1) load in the candidate cell, (2) energy consumption behavior of the candidate cell, (3) individual user quality of service requirements, (4) user mobility pattern, (5) signal-to-interference-plus-noise ratio (SINR) from the candidate cell, (6) the effective load generated by the user to be associated, (7) the available free resources in the candidate cell, as well as the impact of new user association on interference and hence overall system capacity. The problems caused by use of an RSRP-based cell association methodology become more pronounced in networks where a combination of macro cells and small cells is employed because, compared to macro cells, small cells have much shorter range due to their low transmission power and shorter antenna heights. Thus, given a uniform user distribution, a small cell in a dense heterogeneous network is likely to attract a much smaller number of users compared to the number of users of the macro cell. In scenarios where small cells have the same amount of spectrum as macro cells, this leads to serious load imbalance, resource inefficiency and degradation in quality of experience (QoE) by the user. It is to providing solutions to these problems that the novel methodology of the present disclosure is directed. Cell individual offset (CIO) has been proposed and standardized by the 3rd Generation Partnership Project (3GPP) to address this problem. Commercial networks currently set CIO values using ad-hoc methods. A positive value of CIO artificially extends the range of a cell, thereby allowing additional users to be associated with a cell as long as the RSRP from that cell is smaller than the RSRP of the strongest neighbor only by CIO value or less. However, recent work has shown that CIO is not a complete solution to the load imbalance and resultant resource inefficiency problem in HetNets.

Exemplary studies reveal that small cells do not use any CIO, and thus have a marginal share of associated users compared to macro cells. When small cells are given a CIO of 10 decibels (dB) each, which gives them a range boost proportional to the CIO, the associated user share is increased. However, users who have been shifted from macro cells to small cells due to the CIO suffer a significant drop in SINR. This example demonstrates that blanket use of empirically determined CIO values can affect overall resource efficiency in the system negatively, thereby causing the same problem that CIOs were introduced to solve in the first place.

BRIEF DESCRIPTION OF THE DRAWINGS

Several embodiments of the present disclosure are hereby illustrated in the appended drawings. It is to be noted however, that the appended drawings only illustrate several typical embodiments and are therefore not intended to be considered limiting of the scope of the inventive concepts disclosed herein. The figures are not necessarily to scale and certain features and certain views of the figures may be shown as exaggerated in scale or in schematic in the interest of clarity and conciseness. The patent or application file may contain at least one drawing executed in color. Copies of this patent or patent application publication with color drawing(s) will be provided by the Office upon request and payment of the necessary fee.

FIG. 3 shows an algorithm (Algorithm 1) for implementing user associations for given values of three optimization parameters and for obtaining updated values of an objective function with new user associations.

FIG. 4 shows an algorithm (Algorithm 2) which represents the pseudo code for the genetic algorithm used to solve formulation (14).

FIG. 5 shows an algorithm (Algorithm 3) which represents a generic pseudo-code which describes the main elements of a pattern search method used to solve formulation (14).

DETAILED DESCRIPTION

Figure 1:
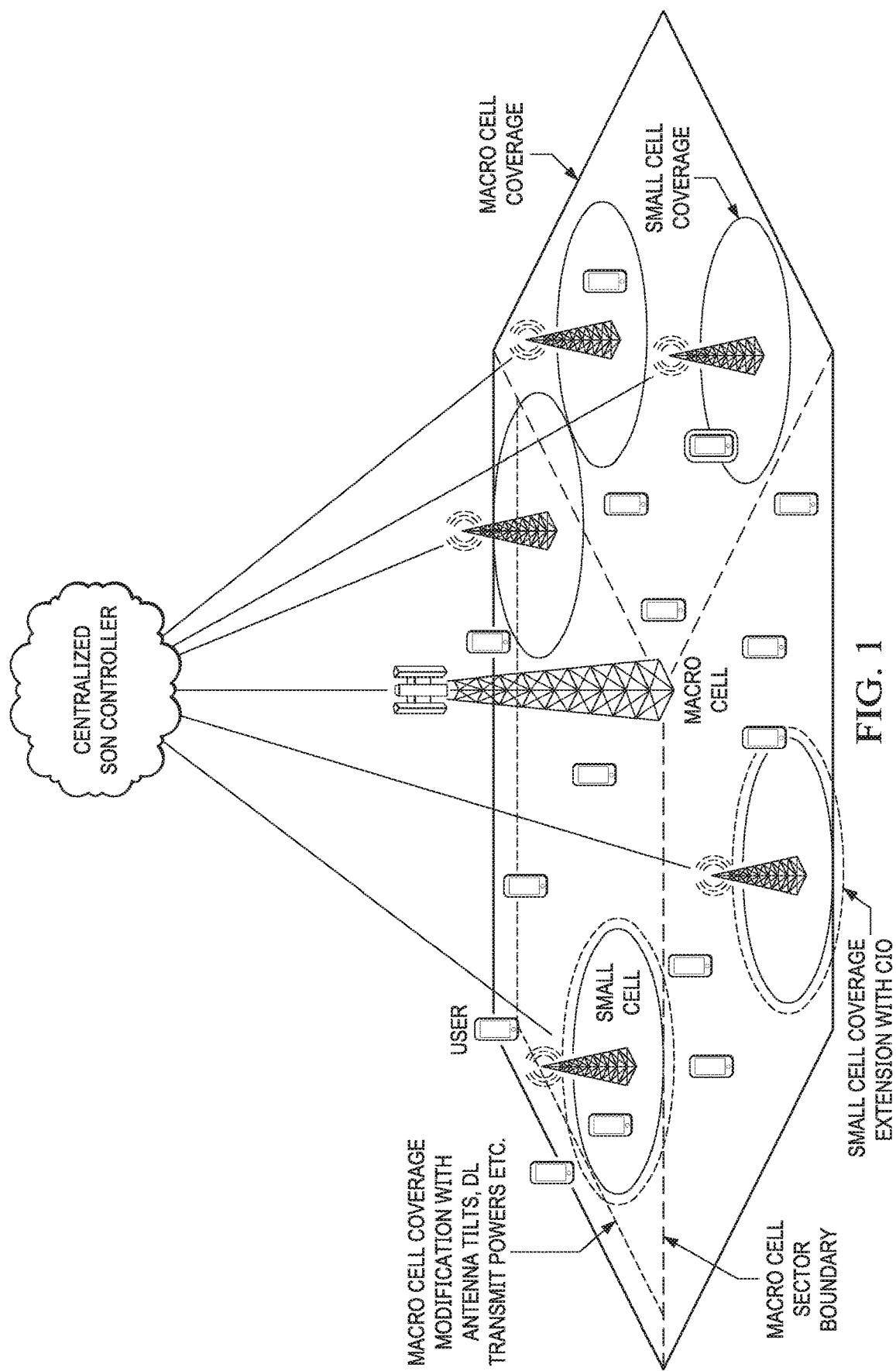
FIG. 1 is a schematic of a self-organizing network (SON) having a centrally-located SON server and a plurality of macro cells and single cells.

The present disclosure is directed to a novel LUA methodology that offers a mechanism to simultaneously optimize network capacity, load distribution, quality of service, energy efficiency and user coverage. The LUA can be implemented by adapting the antenna tilts, transmit powers, cell individual offsets (CIOs), and/or user individual offsets (UIOs) of mobile cellular network cells wherein an enhanced (e.g., optimized) user association can be determined, thereby enhancing downlink user throughput. The method also incorporates a weight parameter based prioritization of cell coverage and load within the user association process, thus allowing flexibility for network operators to favor either performance indicator in coverage-limited or capacity-limited networks, while maximizing user throughputs.

The disclosed LUA methodology can be used to enhance or optimize the network based on the preferences of the network operator in terms of coverage, capacity, and load, or all three simultaneously. Moreover, the LUA methodology is not limited in its application to network optimization, but rather provides an improvement on state-of-the-art coverage based user association methodology. The feasibility and performance of the LUA methodology has been examined by comparing it against two benchmarks through extensive simulations: (i) state-of-the-art maximum cell coverage based user association, and (ii) maximum signal-to-interference ratio (SIR) based user association methodology. Results show that the LUA methodology, in non-limiting embodiments, can satisfy 75% more users compared to maximum SIR based user association and 82% more users compared to maximum coverage based user association methodologies.

Before describing various embodiments of the present disclosure in more detail by way of exemplary description, examples, and results, it is to be understood as noted above that the present disclosure is not limited in application to the details of methods and apparatus as set forth in the following description. The present disclosure is capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

As utilized in accordance with the methods and apparatus of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used herein, all numerical values or ranges (e.g., in units of length such as micrometers or millimeters) include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the term "about" is used to indicate that a value includes the inherent variation of error. Further, in this detailed description, each numerical value (e.g., temperature or time) should be read once as modified by the term "about" (unless already expressly so modified), and then read again as not so modified unless otherwise indicated in context. As noted above, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range. Unless otherwise stated, the term "about" or "approximately", where used herein when referring to a measurable value such as an amount, length, thickness, a temporal duration, and the like, is meant to encompass, for example, variations of ±20% or ±10%, or ±5%, or ±1%, or ±0.1% from the specified value, as such variations are appropriate to perform the disclosed methods and as understood by persons having ordinary skill in the art.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement (e.g., length).

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Turning now to further description of particular embodiments of the present disclosure, provided herein is a novel methodology for maximizing (optimizing) coverage and capacity while minimizing load imbalance among macro cells and small cells in mobile cellular networks, for example in ultra-dense heterogeneous networks (HetNets). The methodology is a user association methodology for use in mobile cellular networks (for example in GSM/UMTS/LTE/LTE-A/LTE-U/5G and beyond) to associate users with cells based on their coverage and load. The disclosed methodology leverages parameters and measurements including, but not limited to, reference signal received power (RSRP), reference signal received quality (RSRQ), channel quality indicator (CQI), and uplink/downlink (UL/DL) ratio of occupied physical resource blocks (PRBs), and energy consumption to identify candidate cells with which to associate an incoming user. The disclosed methodology can be deployed as a stand-alone improvement on the state-of-the-art user association methodology or incorporated into a larger self-organizing network (SON) function that optimizes coverage, capacity, load, quality of service, and energy consumption, individually or simultaneously. The disclosed methodology can be used by mobile cellular network operators (e.g., AT&T, Verizon, etc.), SON solution providers (e.g., CellWize, Intucell, etc.) and/or mobile network equipment manufacturers (e.g., Huawei, Ericsson, etc.).

In at least one embodiment, the presently disclosed methodology can be used as an algorithm in a software system that when integrated into the operations support system (OSS) of a cellular network can significantly improve, enhance, or otherwise optimize the performance of the cellular network. Current solutions do not jointly optimize coverage, load, and capacity as does the presently disclosed methodology.

The LUA methodology has two primary components (1) evaluation of user association at the time a new user enters the network, and (2) re-evaluation of user associations at the time a network objective optimization process is in progress.

In one non-limiting embodiment, the LUA methodology includes the steps of (1) calculating cell load values at the time of initialization, (2) calculating for each incoming user a function (e.g., a weighted product) of the cell loads, downlink (DL) received powers and/or power consumption status, (3) identifying the cell with a highest value of the function and associating a new user with that cell, (4) calculating the resulting network objective function value, and (5) if an optimization process for network objective is underway, separately calculating a user association for each set of network parameters based on load values from the previous set. As noted, these steps may be applied to a SON, wherein the LUA method is carried out by a SON server of the network which may be located centrally (e.g., see FIG. 1). Thus, there is provided a SON server arranged to carry out any method as defined herein. There is provided a software which, when executed by a processor of a SON server, performs any method as defined herein. Such software may be recorded on a computer-readable medium.

The LUA methodology of the present disclosure can be applied to heterogeneous networks having any kinds of cells including femto, pico, micro, and macro, and it can be adapted to networks with only a few of these cell types available. The LUA methodology can be executed by a centralized entity (for example a SON server), so there will be signaling between this centralized entity and the cells. In order to avoid introducing unnecessary control overheads into the network, in certain embodiments, the cell load and parametric configuration vector are only forwarded subject to change in the optimization parameters or new user arrival. In that case, small cells can continue to use the cell load and parametric configuration values until a new update is passed by the SON engine. In certain embodiments of the LUA methodology, all cells are assumed to be of the same radio access technology (RAT). It is not necessary, however, for the macro and small cells to use the same RAT. The RAT for each of them could be any kind, for example, 2G/3G/4G/LTE-A/LTE-U, etc. The LUA methodology may use RSRP+CIO for DL coverage component in the user association. However, the use of RSRP itself is not essential to the LUA methodology. Any other association metric such as reference signal received quality (RSRQ) or channel quality indicator (CQI) can be used interchangeably with RSRP. A new parameter called user individual offset (UIO) can also be incorporated in determining the user association function. The LUA methodology in at least certain embodiments uses CIOs, DL transmit powers, and antenna tilts as optimization variables. However, the LUA methodology disclosed herein is not limited to only these particular optimization variables. For SON controllers (SCs) equipped with directional antennas, antenna parameters like beamwidth and azimuths can also be used as optimization variables. Moreover, in systems with power control capability, power control parameters can also be used in the optimization process. The LUA methodology may utilize user spectral efficiency as an optimization objective, but is not limited to utilizing this objective function. Other suitable objective functions such as, but not limited to, user throughput and downlink SINR, quality of service, or energy consumption can also be used without any other changes into the framework of the LUA methodology. The LUA methodology may utilize one or more non-convex optimization techniques to solve the optimization problem, including, but not limited to genetic algorithm, particle swarm, pattern search, simulated annealing, and sequential quadratic programming. The LUA methodology may consider two user states, e.g., active and idle, or may be applied to other user states, such as but not limited to temporary idle, mobile, and active control channel only. The LUA methodology may consider a two-tier network or any k-tier network, where k>0.

The present methodology utilizes a function of two "hard" parameters, antenna tilt and transmit power, and a "soft" parameter, cell individual offset (CIO), that affect the coverage, capacity and load directly. The resulting solution is a combination of the otherwise conflicting coverage and capacity optimization (CCO) and load balancing (LB) self-organizing network (SON) functions. In the presented joint CCO-LB solution (also referred to herein as CLASS), a conflict-free operation of CCO and LB is ensured by designing a novel load aware user association methodology and resolving the effects of shadowing on coverage probability using stochastic approximation. The problem is proven to be non-convex and is solved using genetic algorithm, sequential quadratic programming, and pattern search algorithms. The CCO-LB solution provided herein is compared against two recently proposed CCO and CCO-LB solutions in literature. Results show that the solution presented herein can yield significant gain in terms of throughput, spectral efficiency, and load distribution.

FIG. 1 is a schematic of a SON having a centrally-located SON server and a plurality of macro cells and single cells. The SON network comprises a centralized SON controller, macro cells, and small cells. The small cells are associated with base stations (BSs).

The present methodology embeds the goals of CCO and LB into a single objective function by introducing a load aware user association method and by jointly optimizing soft parameter CIO and hard parameters tilt and transmit power as follows:

1. Modeling and Analysis: Two versions of the optimization problem are provided which capture the goals of both CCO and LB SON functions in terms of antenna tilt, transmit power, and CIO to reflect the cases of known and unknown user traffic demand. The uncertainty in user coverage, and consequently the coverage constraint of CCO, due to shadowing is resolved by employing stochastic approximation to transform the coverage probability constraint into a deterministic coverage constraint. The convexity of the objective function is analyzed to show that the problem is a non-convex large scale non-parameter (NP)-hard problem. However, since the objective function in the present formulation provides a quickly evaluable quantitative measure of the impact of optimization parameters on network performance, we demonstrate that techniques to solve large-scale problems such as genetic algorithm, sequential quadratic programming, and pattern search can be employed to effectively solve the problem.

2. A New Cell Association Methodology: A novel user association technique that incorporates cell load into the user association decision in addition to RSRP is used. While the disclosed user association scheme is mainly intended for emerging 5G HetNet deployments, we also present a methodology to implement this scheme in legacy cellular networks such as LTE without requiring any change to the standard. The present load-aware user association scheme also offers a mechanism to set the priority level between CCO and LB at cell level or in a centralized fashion as per operator's policy. The load-aware user association scheme is compared against state-of-the art max RSRP and max SINR user association schemes.

3. System Level Performance Analysis and Benchmarking: We use multi-tier system-level simulations to conduct a comprehensive performance analysis of the joint CCO-LB solution in realistic HetNet settings using 3GPP compliant simulation parameters. We compare the results of our solution with the current industrial practice of using fixed parameter settings, and with the two most relevant studies in Ali Imran, et al., "Self Organization of Tilts in Relay Enhanced Networks: A Distributed Solution," IEEE Transactions on Wireless Communications, vol. 13, no. 2, pp. 764-779, Feb. 27, 2014 ("Imran"), and Albrecht J. Fehske, et al., "Concurrent Load-Aware Adjustment of User Association and Antenna Tilts in Self-organizing Radio Networks," IEEE Transactions on Vehicular Technology, vol. 62, no. 5, pp. 1974-1988, June, 2013 ("Fehske"), which are incorporated by reference, that present solutions for CCO and CCO-LB. The comparative analysis investigates performance in terms of a range of key performance indicators (KPIs) that includes network loading, user throughput, SINR and spectral efficiency.

4. New Insights for HetNet Design and Standardization in 5G: The analysis and results provided herein also provide the following design insights for radio efficiency improvement in legacy networks and standardization in emerging 5G based HetNets:

(a) Joint optimization of antenna tilts, transmit powers, and CIOs yields better performance than optimization of individual parameters;

(b) State-of-the-art user association methodology needs an evolution beyond RSRP(+CIO) based user association to include new factors such as cell loads, amplifier operating point (for energy efficiency considerations), expected traffic of incumbent user, mobility pattern estimations, etc.;

(c) There is a need for a paradigm shift from SINR-focused network parameter optimization since SINR optimization in HetNets becomes almost meaningless in the face of imbalanced cell loads;

(d) CIO can be used for more than just biasing RSRP. Results indicate that CIO can be modulated with information about the residual capacity in the cell in dynamic fashion to implement the presently disclosed new load aware user association methodology. This would allow the present load-aware user association to be implemented without requiring any change in the current standard.

The disclosure is organized as follows: (1) the system model used for the joint formulation of CCO-LB SON function problem, (2) the problem formulation and the methodologies used to solve the joint CCO-LB SON function problem, and (3) a system-level performance analysis with the results of present methodology, as well as comparison with the solutions in Imran and Fehske.

A list of key symbols used herein is provided below in Table 1.

TABLE 1

Symbols and definitions

| Symbol | Definition | Symbol | Definition |
|---|---|---|---|
| $\eta_u^c$ | PRB allocated to user u at cell c | $\mathbb{C}$ | Set of all cells |
| $\omega_B$ | Bandwidth per PRB | $\mathbb{U}$ | Set of all active and idle users |
| $\check{\tau}_u$ | Desired user throughput | $\mathbb{U}_c$ | Set of all active users |
| $\gamma_u^c$ | SINR of user u at cell c | $\hat{\mathbb{U}}$ | Set of all active satisfied users |
| $N_b^c$ | Total PRBs at cell c | $\kappa$ | Thermal noise |
| $\delta_u^c$ | Shadowing of user u at cell c | $P_{r,u}^c$ | Downlink Rx power to user u from cell c |
| $\alpha$ | Pathloss constant | $\omega$ | Network coverage threshold |
| $\beta$ | Pathloss exponent | $P_{th}^c$ | Downlink Rx power threshold |
| $d_u^c$ | Distance of user u from cell c | $\eta_{th}^c$ | Cell load threshold |

TABLE 1-continued

Symbols and definitions

| Symbol | Definition | Symbol | Definition |
|---|---|---|---|
| $P_t^c$ | Tx power of cell c | $\alpha$ | User association exponent |
| $\mu$ | Antenna gain constant | $\Omega$ | Objective value for CLASS solution |
| $\psi_u^c$ | Vertical angle between user u and cell c | $\psi_{tilt}^c$ | Antenna tilt of cell c |

1. System Model

Described below is a non-limited embodiment of a system model employed in the formulation of the joint CCO-LB SON function and the underlying assumptions.

A. Network and User Specifications

For formulating the joint CCO-LB problem, we consider a network of hexagonal macro base stations with at least one randomly deployed small cell in the coverage area of each macro cell. 100% frequency reuse is considered between macro and small cells. Macro cells use directional antennas while small cells employ omnidirectional antennas. An orthogonal frequency-division multiple access (OFDMA)-based system with resources divided into physical resource blocks (PRBs) of fixed bandwidth is assumed. For conciseness, the downlink direction is chosen for the analysis as this is where most imbalance in coverage of macro and small cells occurs. It is assumed that users in the network are stationary. It is further assumed that requested user data rate is known, which gives a lower bound on the desired instantaneous user throughput. Desired user throughput can be modeled as a spatiotemporal function of subscriber behavior, subscription level, service request patterns, and the applications being used with the help of big data analytics. The present formulation is not dependent on particular scheduling techniques.

B. Parameters and Measurements (1) Cell Loads: We can define instantaneous cell load as the ratio of PRBs occupied in a cell during a transmission time interval to total PRBs available in the cell. This information is available as a standard measurement from 3GPP as "UL/DL total PRB usage" and can be broadcast to the users. To define cell load $\eta_c$ for the system model, a minimum number of PRBs $\eta_u^c$ to be allocated to a user is calculated as follows:

$$\eta_u^c = \frac{1}{\omega_B}\left(\frac{\check{\tau}_u}{f(\gamma_u^c)}\right) \quad (1)$$

where $\check{\tau}_u$ represents the desired throughput of user $u \in \mathbb{U}_c$, where $\gamma_u^c$; represents the SINR of user u when associated with cell c and $\omega_B$ is the bandwidth per PRB. Considering features such as multiple-input and multiple-output (MIMO), coding scheme gains, and scheduling gains, then $f(\gamma_u^c)$ can be defined as $f(\gamma_u^c):=A\log_2(1+B\gamma_u^c)$, where A and B are constants that can capture throughput gains (per PRB) achievable from various types of diversity schemes, losses incurred by signaling overheads, or hardware inefficiencies.

For the sake of simplicity and without loss of generality, it is assumed that A=B=1. Thus, residual cell capacity and cell load are defined as follows:

$$\text{Residual Capacity} = \Lambda_c = N_b^c - \left(\frac{1}{\omega_B}\sum_{\hat{u}_c}\frac{\tilde{\tau}_u}{\log_2(1+\gamma_u^c)}\right) \quad (2)$$

$$\text{Cell Load} = \eta_c = \frac{1}{N_b^c}\left(\frac{1}{\omega_B}\sum_{\hat{u}_c}\frac{\tilde{\tau}_u}{\log_2(1+\gamma_u^c)}\right) \quad (3)$$

where $N_b^c$ is the total PRBs at cell c. Consequently, the range of cell load is $\eta_c \in [0, \infty)$. If the cell load exceeds 1, the cell will be fully loaded and incoming users will be blocked. The value of cell load c is therefore referred to as virtual load and $\eta_c > 1$ reflects congestion in cell c.

(2) Received Power: In LTE networks, downlink RSRP from nearby base stations is continuously monitored by the users and reported to the serving cell for a number of purposes. In a CCO-LB approach, the RSRP is used to calculate coverage probability in the network.

(3) CIO: CIO can be defined as a combination of multiple cell association parameters introduced by the 3 GPP including cell hysteresis, cell offsets and event-related offsets, which are used to decide user association. CIO information is by each cell and decoded by the users as part of standard operation. CIO is treated herein as a simple virtual boost in RSRP.

2. Problem Formulation and Methodologies

To incorporate QoE into the joint CCO-LB optimization, the problem is formulated as per-cell, per-user throughput optimization. The first step towards this goal is to build an SINR model as a function of all three optimization parameters under consideration.

A. User SINR as a Function of Tilt, Transmit Power, and CIO

Downlink reference signal quality $\hat{\gamma}_u^c$, at a user location u when associated with a cell c can be expressed as the ratio of received reference signal power $P_{r,u}^c$ by user u from cell c to the sum of received reference signal power by user u from all cells i such that $\forall i \in \mathbb{C}/c$ and the thermal noise power $\kappa$:

$$\hat{\gamma}_u^c = \frac{P_t^c G_u G_u^c \delta_u^c a(d_u^c)^{-\beta}}{\kappa + \sum_{\forall i \in \mathbb{C}/c} P_t^i G_u G_u^i \delta_u^i a(d_u^i)^{-\beta}} \quad (4)$$

where $P_t^c$ and $P_t^i$ are the transmit powers of serving cell c and interfering cell i, $G_u$ is the gain of user equipment, $G_u^c$ and $G_u^i$ are the gains of transmitter antenna of the cells c and i as seen by the user u, $\delta_u^c$ is the shadowing observed by the signal, $\alpha$ is the path loss constant, $d_u^c$ and $d_u^i$ represent distance of user u from cell c and i, and $\beta$ is the pathloss exponent.

The expression in equation (4) is useful when estimating the quality of reference signals that are always being transmitted by all the cells. Thus $\gamma_u^c$ is not a true measure of SINR on the PRBs where interference generated is dependent on utilization of that same PRB in other cells at the same time. It is assumed that user arrival in the system follows a general distribution, thus the exact interference becomes a function of time. Therefore, to obtain an SINR estimate independent of time, a reasonable low-complexity substitute for average downlink interference from a cell i is to use the ratio of occupied PRBs in the cell. The expression for an SINR estimate for user u in cell c can then be given as:

$$\gamma_u^c = \frac{P_t^c G_u G_u^c \delta_u^c a(d_u^c)^{-\beta}}{\kappa + \sum_{\forall i \in \mathbb{C}/c} \hat{\eta}_i P_t^i G_u G_u^i \delta_u^i a(d_u^i)^{-\beta}} \quad (5)$$

where $\hat{\eta}_i$ denotes actual cell load in a cell that, for a cell c, can be obtained by modifying equation (3) as:

$$\hat{\eta}_c = \frac{1}{N_b^c}\left(\frac{1}{\omega_B}\sum_{\hat{u}_c}\frac{\tilde{\tau}_u}{\log_2(1+\gamma_u^c)}\right) \quad (6)$$

where $\hat{\mathbb{U}}_c \in \mathbb{U}_c \in \mathbb{U}$ is the set of all users associated with the cell which are allocated resources by the cell and $\eta_c \in [0,1]$. In the SINR expression in equation (5), the virtual cell load from equation (3) is not used. Instead, the actual cell load, which can never exceed 1, is used.

As macro cells in the system under consideration use directional antennas, using the expression for 3D antenna gain from Ali Imran, et al., "Challenges in 5G: How to Empower SON with Big Data for Enabling 5G," IEEE Network, vol. 28, no. 6, pp. 27-33, November, 2014, which is incorporated by reference, the gain from transmitter to user $G_c^c$ can be given as:

$$G_u^c = 10^{-1.2\left(\lambda_v\left(\frac{\psi_u^c - \psi_{tilt}^c}{B_v}\right)^2 + \lambda_h\left(\frac{\phi_u^c - \phi_a^c}{B_h}\right)^2\right)} \quad (7)$$

where $\lambda_v$ is the weight of a vertical beam pattern of a transmitter (macro cell base station) antenna; $\psi_u^c$ is the vertical angle between user u and the transmit antenna of cell c; $\psi_{tilt}^c$ is the tilt angle of a serving cell antenna, $\Delta_h$ and $\lambda_v$ are the weighting factors for horizontal and vertical beam pattern, respectively; $\phi_u^c$ is the horizontal angle of user u from cell c; $\phi_a^c$ is the azimuth of antenna of cell c; and $B_h$ and $B_v$ are horizontal and vertical beam widths of the transmitter antenna of cell c, respectively.

As our variable of interest in equation (7) is the tilt angle and the rest of the antenna parameters can be treated as constants, for the sake of conciseness, equation (7) can be simplified using the following substitution:

$$x_u^c = \frac{(B_v)^2 \lambda_h}{\lambda_v}\left(\frac{\phi_u^c - \phi_a^c}{B_h}\right)^2 \quad (8)$$

The SINR expression from equation (5) can be rewritten as:

$$\gamma_u^c = \frac{P_t^c G_u 10^{\mu\left((\psi_u^c - \psi_{tilt}^c)^2 + x_u^c\right)} \delta_u^c a(d_u^c)^{-\beta}}{\kappa + \sum_{\forall i \in \mathbb{C}/c} \hat{\eta}_i P_t^i G_u 10^{\mu\left((\psi_u^i - \psi_{tilt}^i)^2 + x_u^i\right)} \delta_u^i a(d_u^i)^{-\beta}} \quad (9)$$

where $\mu$ is consolidated constant based on fixed antenna characteristics.

$$P_{r,u_{dBm}}^c = \acute{P}_{r,u_{dBm}}^c - P_{CIO_{dB}}^c \quad (10)$$

where $P_{r,u_{dBm}}^c$ is the true signal power in decibel-milliwatts (dBm) received by user u from cell c and $\acute{P}_{r,u_{dBm}}^c$ is the received power reported back by user u to cell c in dBm. This value includes the $P_{CIO_{dB}}^c$ of cell c in dB, which is then subtracted by the cell to retrieve $P_{r,u_{dBm}}^c$.

The motivation behind introduction of CIO is to allow load balancing among cells. However, as described above, if CIO has to be invoked to alter natural RSRP-based cell association for the user, the SINR for that user is bound to be lower. Nevertheless, CIO is a necessary means to balance cell loads, while capacity loss due to drop in SINR can partially be offset if the cell association takes into account cell load and RSRP.

B. An Improved Load-Aware User Association Mechanism

One way to determine user associations $U_c$ is to use the RSRP measurements along with CIO values as given in equation (10). However, this method overlooks the key role of user association in overall capacity and QoS through cell load and SINR distributions. To overcome this challenge, user association with cell j is established not only based on received power, but also load in that cell. More specifically, this load-aware user association with cell j can be determined as:

$$\mathbb{U}_j := \{\forall u \in \mathbb{U} \mid j = \arg\max_{\forall c \in \mathbb{C}} ((1/\eta_c)^{\alpha *} (\hat{P}_{r,u}^c)^{(1-\alpha)}\} \quad (11)$$

where $\mathbb{U}_j$ is a set of all users for whom a scaled version of the product of the received power in watts $\hat{P}_{r,u}^c$ as reported by the user u and the normalized residual cell capacity is maximized for cell j. $\alpha \in [0,1]$ a $\in [0,1]$ is a weighting factor introduced to allow trading between the impact of received power and cell load measurements in the user association. As established in equation (3), cell load is dependent on the SINR of users in the cell, so that better SINRs of users in a candidate cell yield lesser loads in the cell for given traffic demand. In equation (11), to make new user association decisions with a cell, the virtual load, not the actual load, is used. While using the actual load that has range $\hat{\eta}_c \in [0,1]$ can indicate the current load in a cell, it cannot help take into account the users that are already associated with that cell but were not served. On the other hand, the virtual cell load as defined in equation (3) with range $\eta_c \in [0, \infty)$ provides a truer picture of effective potential load in the candidate cell.

The expression in equation (11) gives the set $\mathbb{U}_j$ of users to be associated with the cell j and thus represents both active and idle users. On the other hand, the set $U_c$ used in the expression for SINR in equation (9) represents the set of only active users associated with the cell c. With $\alpha=1$, the user association simply becomes a function of cell load and SINR at the time of association. Consequently, this cell association espouses the LB SON function only. On the other hand, if $\alpha=0$, the proposed user association method simply represents current RSRP-based cell association, which helps achieve coverage optimization in the CCO SON function. Determining the optimal value of the weighting factor is an important optimization problem. Below, KPIs are evaluated with a range of [0,1], and interesting trends that can be used to develop some practical design guidelines are discussed.

C. Problem Statement

A common approach towards throughput maximization in LB or CCO is to use a problem formulation that maximizes the mean throughput per user per cell. However, if one tries to maximize the arithmetic mean of user throughput determined by the SINR expression derived above, users with no throughput and cells with no load will be equally acceptable as users with very high throughputs and cells with full loads. While such formulation will achieve the objectives of CCO, it will not perform load balancing, and hence cannot be a suitable approach for joint CCO-LB. To simultaneously reflect the goals of both CCO and LB in a single objective function, the objective function is modeled as:

$$\max_{P_t^c, \psi_{tilt}^c, P_{tilt}^c, P_{CIO}^c} \left( \prod_{\mathbb{C}} \left( \prod_{\mathbb{U}_c} \omega_u^c \cdot \log_2(1+\gamma_u^c) \right)^{1/|\mathbb{U}_c|} \right)^{1/|\mathbb{C}|} \quad (12)$$

The outer geometric mean in this formulation dampens the load disparity among cells, and thus integrates LB goal into the optimization objective. This formulation is intended for scenarios where user-required rates are not known or predicted. Thus, use of inner geometric mean instead of arithmetic mean for user throughput protects users with lower SINR from being unfairly treated, while maximizing the overall throughput. If, however, the desired user throughput is already known or can be predicted, a more greedy approach can be adopted by replacing the inner geometric mean with arithmetic mean as it is bound to provide an improved or equivalent result. The new objective function with this assumption is given as:

$$\max_{P_t^c, \psi_{tilt}^c, P_{tilt}^c, P_{CIO}^c} \left( \prod_{\mathbb{C}} \left( \left( \sum_{\mathbb{U}_c} \omega_u^c \cdot \log_2(1+\gamma_u^c) \right) / |\mathbb{U}_c| \right) \right)^{1/|\mathbb{C}|} \quad (13)$$

Equations (12) and (13) inherit two basic constraints to achieve full objectives of CCO and LB SON function i.e.:

i. The ratio of covered users C must meet or exceed the minimum network coverage threshold $P_{th}^c$:

$$\frac{1}{|\mathbb{C}|} \sum_{\mathbb{C}} \frac{1}{|\mathbb{U}_c|} \sum_{\mathbb{U}_c} \mathbb{1}(P_{r,u}^c \geq P_{th}^c) \geq \varpi \text{ i.e. } C > \varpi$$

where C is dependent on the number of users satisfying the equation $P_{r,u}^c > P_{th}^c$.

ii. Cell load, as defined in equation (3), for every cell has to be less than or equal to the cell load thresholds set by operator policies: $\eta_c \leq \eta_{th}^c \forall c \in \mathbb{C}$.

An additional constraint is introduced in the formulation to avoid blocking any users i.e.:

iii. $\hat{\mathbb{U}}_c$ by cell c must be equal to the set of active users $\mathbb{U}_c$ associated with the cell c: $\hat{\mathbb{U}}_c = \mathbb{U}_c$.

The satisfaction of constraint (i) depends heavily on the path loss model employed in equation (4). Despite the assumption that user location remains the same over time, random variations in shadowing $\delta_u^c$ over space introduce uncertainty into the determination of $P_{r,u}^c$. Consequently, coverage becomes a function of the distribution of $\delta_u^c$ such that constraint (i) becomes $P_r(C(\delta_u^c) \geq P_{th}^c)$. This also implies that the evaluation of $P_{r,u}^c \geq P_{th}^c$ is a probabilistic problem rather than a deterministic one, which can make the overall problem intractable. In order to overcome this issue, constraint (i) is reformulated such that it becomes deterministic.

Proposition 1: For Gaussian distributed shadowing $\delta_u^c$, the probable coverage ratio $P_r(C(\delta_u^c))$ can be estimated using the transformation $$\frac{1}{|\mathbb{C}|} \sum_{\mathbb{C}} \frac{1}{|\mathbb{U}_c|} \sum_{\mathbb{U}_c} \mathbb{1}(P_{r,u}^c \geq P_{th}^c) \geq \varpi.$$

Substituting the expression for SINR from equation (9) in equation (12) gives the fair joint CCO-LB formulation given in expression (14a), while substituting SINR from equation (9) in equation (13) gives the greedy joint CCO-LB formulation given in expression (14b). Combining the two formulations with the above problem constraint and user association expression in equation (11) gives the final formulation in formulation (14).

$$\max_{P_t^c, \psi_{tilt}^c, P_{CIO}^c} \Omega = \max_{P_t^c, \psi_{tilt}^c, P_{CIO}^c}$$

$$\left\{ \prod_{\mathbb{C}} \left( \prod_{u_c} \omega_u^c \cdot \log_2 \left( 1 + \frac{P_t^c G_u 10^{\mu((\psi_u^c - \psi_{tilt}^c)^2 + x_u^c)} \delta a(d_u^c)^{-\beta}}{\kappa + \sum_{\forall i \in c/\mathbb{C}} \hat{\eta}_i P_t^i G_u 10^{\mu((\psi_u^i - \psi_{tilt}^i)^2 + x_u^i)} \delta a(d_u^i)^{-\beta}} \right) \right)^{\frac{1}{|u_c|}} \right\}^{1/|\mathbb{C}|}$$

or $$\max_{P_t^c, \psi_{tilt}^c, P_{CIO}^c}$$

$$\left\{ \prod_{\mathbb{C}} \left( \sum_{u_c} \omega_u^c \cdot \log_2 \left( 1 + \frac{P_t^c G_u 10^{\mu((\psi_u^c - \psi_{tilt}^c)^2 + x_u^c)} \delta a(d_u^c)^{-\beta}}{\kappa + \sum_{\forall i \in c/\mathbb{C}} \hat{\eta}_i P_t^i G_u 10^{\mu((\psi_u^i - \psi_{tilt}^i)^2 + x_u^i)} \delta a(d_u^i)^{-\beta}} \right) \middle/ u_c \right) \right\}^{1/|\mathbb{C}|}$$

subject to 
$$\begin{cases} \frac{1}{|\mathbb{C}|} \sum_\mathbb{C} \frac{1}{|u_c|} \sum_{u_c} 1(P_{r,u}^c \geq P_{th}^c) \geq \bar{\omega} \\ \eta_c \leq \eta_{th}^c \forall c \in \mathbb{C} \\ \hat{u} = u_c \end{cases}$$

$$u_j := \left\{ \forall u \in u \mid j = \arg\max_{\forall c \in \mathbb{C}} ((1/\eta_c)^\alpha * (P_{r,u}'^c)^{(1-\alpha)}) \right\}$$

Solution Methodology

In this section, the convexity of the joint CCO LB user association aware SON function (CLASS) presented in formulation (14) is analyzed, then methodologies to implement it are presented.

A. Convexity Analysis

Assuming a network of macro cells only, the range of transmission powers is $P_t^c \in [20\ W, 40\ W]$, antenna tilts are $\psi_{tilt}^c \in [90°+0°, 90°+15°]$, and CIOs are $P_{CIO}^c \in [0\ dB, 10\ dB]$. Affine sets are convex sets, therefore, the first requirement for convexity for problem formulation (14), i.e., the constraints should be convex, is fulfilled. Geometric and arithmetic means preserve convexity of a function, and the logarithmic function is also a convex function over the interval (0; 1). This leaves the SINR expression in (9) to be examined to see if the formulation in (14) is convex or not.

Proposition 2: SINR as a function of antenna tilts as given in equation (9) is a non-convex function.

Figure 2:
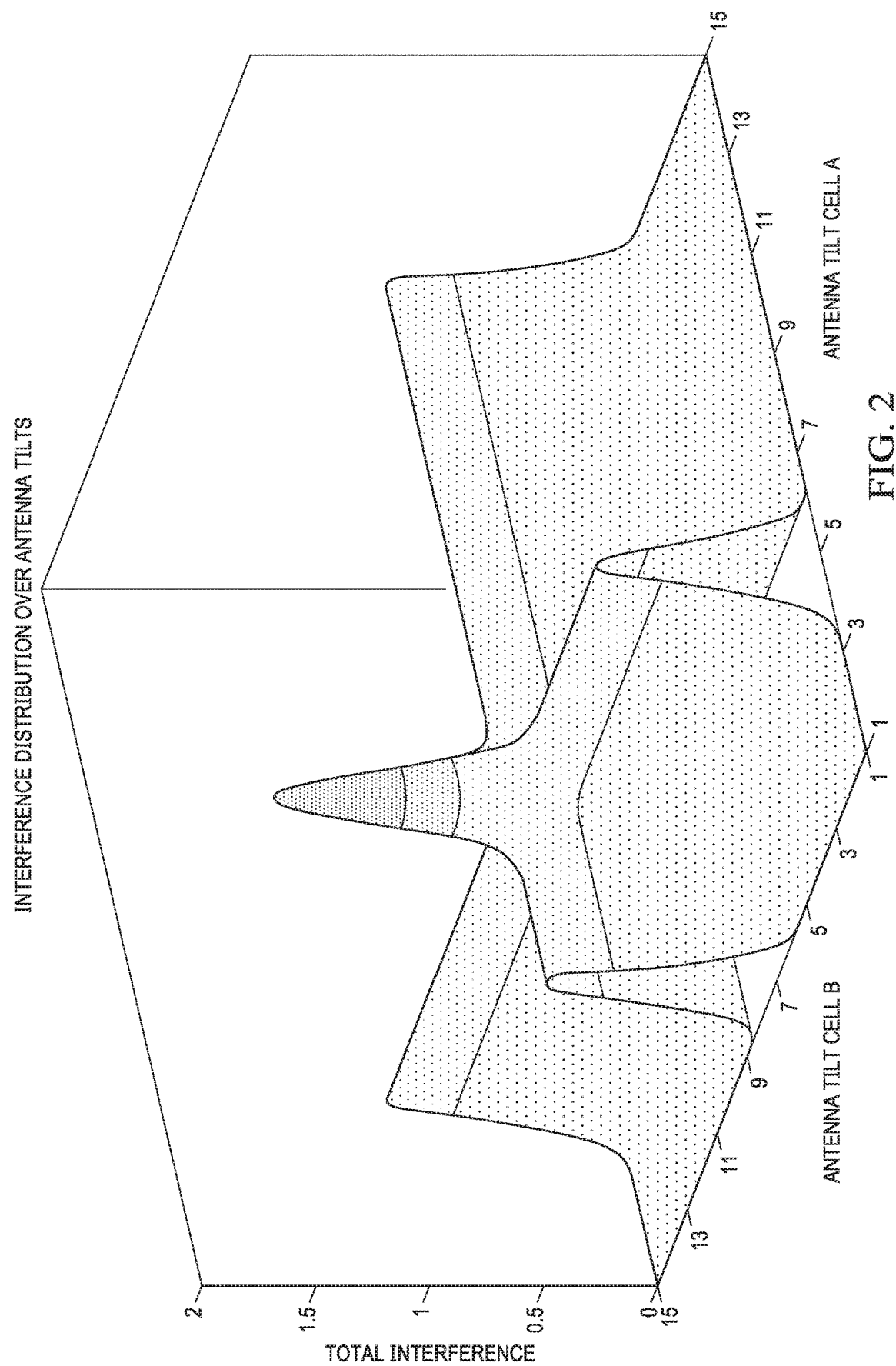
FIG. 2 shows an interference distribution over antenna tilts of interferers.

Proof: FIG. 2 plots the interference (denominator of equation (9)) as a function of antenna tilts of two neighboring cells. Clearly it is not a convex function implying proposition 2.

B. Alternate Solution Methodologies

Given the non-convexity and large scale of the problem, heuristic approaches can find an optimal or a near optimal solution of the formulation in formulation (14).

Algorithm to Implement the Presented Cell Association:

Before delving into possible non-convex optimization techniques to solve formulation (14), an algorithm to practically implement the user associations for given values of the three optimization parameters and obtain the updated value of objective function with new user associations is presented in Algorithm 1 (see FIG. 3). This routine is called at each iteration of the heuristic optimization techniques.

Sequential Quadratic Programming (SQP):

One way to solve non-convex problems of the type in formulation (14) that have linear constraints is to approximate it piece-wise with a convex quadratic function and then use convex optimization to solve it, a method also known as sequential quadratic programming. To leverage SQP, formulation (14) can be rewritten as:

$$\min_{P_t^c, \psi_{tilt}^c, P_{CIO}^c} -\Omega(P_t^c, \psi_{tilt}^c, P_{CIO}^c) \quad (15)$$

subject to $$\begin{cases} a(P_t^c, \psi_{tilt}^c, P_{CIO}^c) = \bar{\omega} - \frac{1}{|\mathbb{C}|} \sum_\mathbb{C} \frac{1}{|u_c|} \sum_{u_c} 1(P_{r,u}^c \geq P_{th}^c) \leq 0 \\ b(P_t^c, \psi_{tilt}^c, P_{CIO}^c) = \eta_c - \eta_{th}^c \leq 0 \forall c \in \mathbb{C} \\ c(P_t^c, \psi_{tilt}^c, P_{CIO}^c) = \hat{u}_c = u_c \end{cases}$$

$$u_j := \left\{ \forall u \in u \mid j = \arg\max_{\forall c \in \mathbb{C}} ((1/\eta_c)^\alpha * (P_{r,u}'^c)^{(1-\alpha)}) \right\}$$

Compared to an unconstrained problem or a problem with an inequality constraint, equality constraints can reduce the search space of the optimization problem significantly. We can also express user association as a constraint such that for $u \in u_c$:

$$Z(P_t^c, \psi_{tilt}^c, P_{CIO}^c) := \Sigma_{i \in \mathbb{C}/c} 1((1/\eta_c)^{\alpha*}(\dot{P}_{r,u}^c)^{(1-\alpha)} \geq (1/\eta_i)\alpha*(\dot{P}_{r,u}^i)^{(1-\alpha)}) - |\mathbb{C}|+1 = 0 \quad (16)$$

The expression in equation (16) means that, for a user u to be associated with cell c, the association function of the user with that cell must be greater than all the other cells. The Lagrangian of equation (16) is given by:

$$\mathcal{L}(P_t^c, \psi_{tilt}^c, P_{CIO}^c, \lambda^1, \lambda^2, \lambda^3, \lambda^4, \lambda^5, \lambda^6, \lambda^7) = \quad (17)$$

$$\Omega(P_t^c, \psi_{tilt}^c, P_{CIO}^c) - \lambda^1 W(P_t^c, \psi_{tilt}^c, P_{CIO}^c) - \sum_{c \in \mathbb{C}} \lambda_c^2 X(P_t^c, \psi_{tilt}^c, P_{CIO}^c) -$$

$$\sum_{c \in \mathbb{C}} \lambda_c^3 Y(P_t^c, \psi_{tilt}^c, P_{CIO}^c) - \sum_{u \in U} X_u^4 Z(P_t^c, \psi_{tilt}^c, P_{CIO}^c) -$$

$$\sum_{c \in \mathbb{C}} \lambda_c^5 (P_t^c - P_{t,min}^c) - \sum_{c \in \mathbb{C}} \lambda_c^6 (\psi_{tilt}^c, -90) - \sum_{c \in \mathbb{C}} \lambda_c^7 (P_{CIO}^c)$$

where $\lambda^x$ represents the xth vector of Lagrangian multipliers for the constraints in equations (15) and (16). Thus, the quadratic sub-problem to be solved at each iteration of SQP is given by formulation (18), where $\hat{H}$ represents the approximate Hermitian matrix, which is updated at each iteration using the Broyden-Fletcher-Goldfarb-Shanno approximation method.

$$\min_y \left(\frac{1}{2}\right) y^T \hat{H}(\mathcal{L}(P_t^c, \psi_{tilt}^c, P_{CIO}^c, \lambda^1, \lambda^2, \lambda^3, \lambda^4, \lambda^5, \lambda^6, \lambda^7)) y + \quad (18)$$

$$\nabla \Omega(P_t^c, \psi_{tilt}^c, P_{CIO}^c)$$

subject to =

$$\begin{cases} y_i + W(P_t^c, \psi_{tilt}^c, P_{CIO}^c) \leq 0, \text{ for } i = 1 \\ y_i + X(P_t^c, \psi_{tilt}^c, P_{CIO}^c) \leq 0, \text{ for } i = 2, \ldots, |C| + 1 \\ y_i + Y(P_t^c, \psi_{tilt}^c, P_{CIO}^c) = 0, \text{ for } i = |C| + 2, \ldots, 2|C| + 1 \\ y_i + Z(P_t^c, \psi_{tilt}^c, P_{CIO}^c) = 0, \text{ for } i = 2|C| + 2, \ldots, 2|C| + |U| + 1 \\ y_i + P_t^c - P_{t,min}^c \leq 0, \text{ for } i = 2|C| + |U| + 2, \ldots, 3|C| + |U| + 1 \\ y_i + \psi_{tilt}^c - 90^c \leq 0, \text{ for } i = 3|C| + |U| + 2, \ldots 4|C| + |U| + 1 \\ y_i + \psi_{tilt}^c \leq 0, \text{ for } i = 4|C| + |U| + 2, \ldots, 5|C| + |U| + 1 \end{cases}$$

Other Heuristic Techniques:

Through results presented above, it is shown that SQP returns an acceptable solution with a low number of iterations in most instances at the cost of a lack of guarantee that the solution is optimal due to the large dimensions of the problem in formulation (14). Furthermore, the enormous search space size of formulation (14) makes validation of the results produced through brute force difficult. Therefore, heuristic techniques that are known to converge to optimal solutions given enough iterations were tried. Two such heuristics, genetic algorithms and pattern search, which yielded promising results for this problem, are discussed below.

Genetic Algorithms:

Genetic algorithms are known to be one of the most suitable heuristic algorithms available for solving complex combinatorial problems like formulation (14). The genetic algorithm starts from a random parameter set in the solution space, therefore, for each run, the time to find the feasible space is different. However, once found, the algorithm can quickly move towards the optimal solution in the feasible space. Algorithm 2 (see FIG. 4) represents the pseudo code for the genetic algorithm used to solve formulation (14).

Pattern Search:

Another effective solution methodology to solve formulation (14) is the pattern search method also known as coordinate descent method, S. J. Wright, "Coordinate descent algorithms", Mathematical Programming Journal, vol. 151, no. 1, pp. 3-34, 2015, which is incorporated by reference. Algorithm 3 (see FIG. 5) presents a generic pseudo-code, which describes the main elements of a pattern search method using the Nelder-Mead algorithm as the exploratory search algorithm within each iteration of the pattern search.

3. System-Level Performance Analysis

A. Simulation Setup

An LTE 3GPP-compliant network topology simulator is employed to generate typical macro- and small-cell-based network and user distributions. The simulation parameters details are given in Table 2. A wrap-around model simulates interference in an infinitely large network, thus avoiding the boundary effect. To model realistic networks, users are distributed non-uniformly in all the sectors such that a fraction of users are clustered around randomly located hotspots in each sector. Monte Carlo simulations estimate average performance of the algorithms. User traffic requirement profiles corresponding to 24 kilobits per second (kbps), 56 kbps, 128 kbps, 512 kbps, and 1024 kbps desired throughput are considered.

B. Results

In this Section, different a values used in load-aware user association on CLASS, along with a comparison of load-aware user association with current RSRP and maximum SINR user association methods are evaluated. Using the proposed load-aware user association with the best-performing a value, results from four fixed-parameter settings (FPSs) are compared against the optimal parameter values returned by both CLASS equations using SQP, genetic algorithm, and pattern search to demonstrate their gain. For simplicity, the CLASS solution in equation (14a) is henceforth referred to as CLASS1 and the CLASS solution in equation (14b) is referred to as CLASS2. The results of proposed solutions are further compared with the two algorithms that are most relevant to this work, i.e., the distributed tilt-based CCO solution presented in Imran and a tilt-based CCO-LB function. Due to the use of virtual loads in the system, the user association from Fehske returns undefined results. Therefore, the algorithm in Fehske is implemented using load-aware user association.

TABLE 2

Parameter Settings for Simulation

| System Parameters | Value |
|---|---|
| No. of Macro Base Stations | 7 |
| Sectors per Base Station | 3 |
| Small Cells per Sector | 1 |
| Number of Users per Sector | 25 |
| Transmission Frequency | 2 gigahertz (GHz) |
| Transmission Bandwidth | 10 megahertz (MHz) |
| Network Topology | Hexagonal |
| Macro Cell Transmit Power | Max: 46 dBm, Min: 40 dBm |
| Macro Cell Antenna Tilt | Max: 15, Min: 0 |
| Small Cell Transmit Power | Max: 30 dBm, Min: 27 dBm |
| Small Cell CIO | Max: 10 dB, Min: 0 dB |
| Fixed Parameter Settings (FPSs) | Macro Transmit Power: 43 dBm; Small Transmit Power: 27 dBm; Tilt: 0 (FPS-0), 10 (FPS-10), 15 (FPS-15), 20 (FPS-20); CIO: 0 dB |
| Cellular System Standard | LTE |
| Macro Cell Height | 25 m |
| Small Cell Height | 10 m |
| Inter-site Distance (Macro) | 500 m |
| Macro Cell Antenna Gain | 17 dBi |
| Small Cell Antenna Gain | 5 dBi |
| Coverage Threshold Pthc | 95% |
| Load Threshold th$^c$ | 100% |

Impact of Load-Aware User Association:

The load-aware user association in equation (11) is dependent on 3 features: cell loads at the time of association, downlink received power with CIO, and the association exponent. The impact of cell loads and received powers on user association are obvious from equation (11); however, the impact of exponent value on user association requires quantitative evaluations of system KPIs for different values of α. A very relevant KPI in this case is the cell load and its distribution among cells for given total traffic in the network. A lower average cell load and smaller load variance among cells for given traffic reflects a better performing user association scheme and vice versa. Though a comparison of α∈[0; 1] for both CLASS formulations was performed, for brevity FIG. 6 presents only cell load distribution for α∈[¼; ½].

Figure 6:
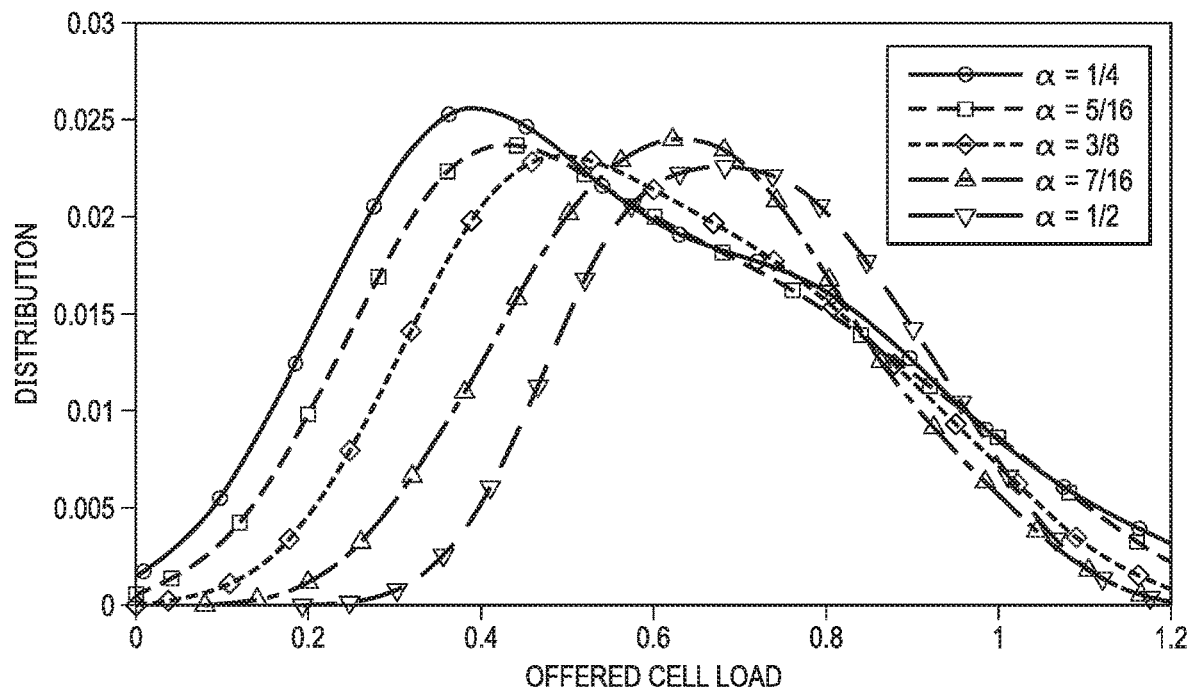
FIG. 6 shows results of a comparison of Offered Cell Load Distribution for values in Load-aware User Association.

From the results in FIG. 6, it can be seen that the load distribution improves and becomes the most compact at α=7/16 and starts to spread beyond it. Using α=7/16, FIGS. 7 and 8 present a comparison of the disclosed load-aware user association with coverage-based max RSRP user association and quality-based max SINR user association techniques for macro and small cells.

Figure 7:
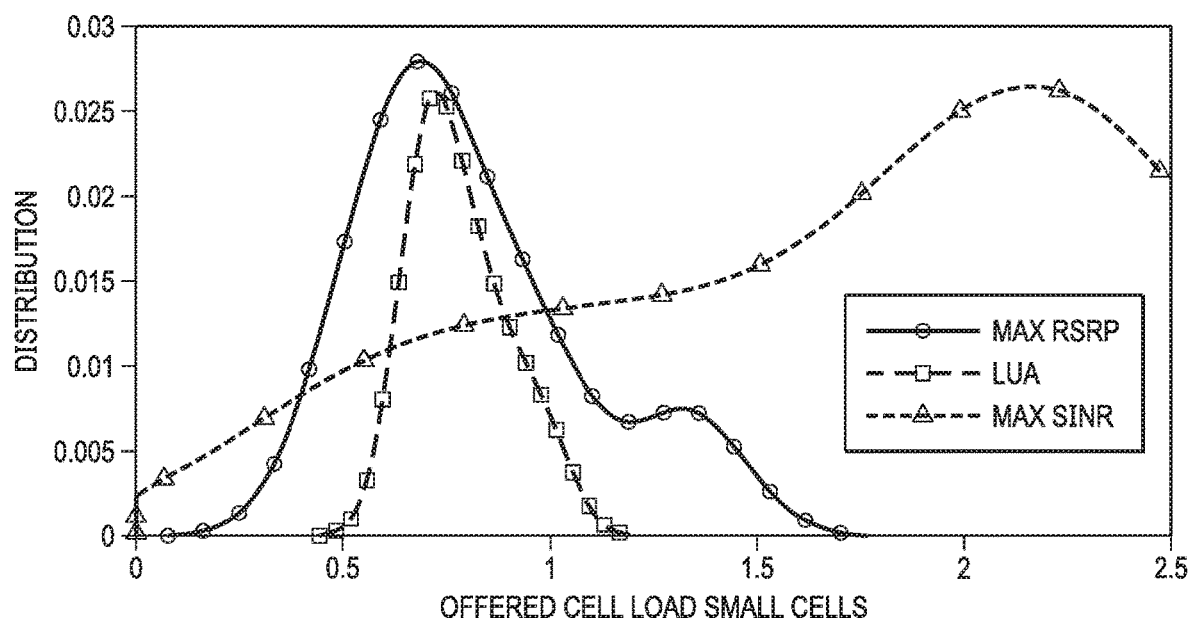
FIG. 7 shows results of a comparison of Offered Small Cell Load Distribution for load-aware user association (LUA) vs. Max RSRP and Max SINR user association.
Figure 8:
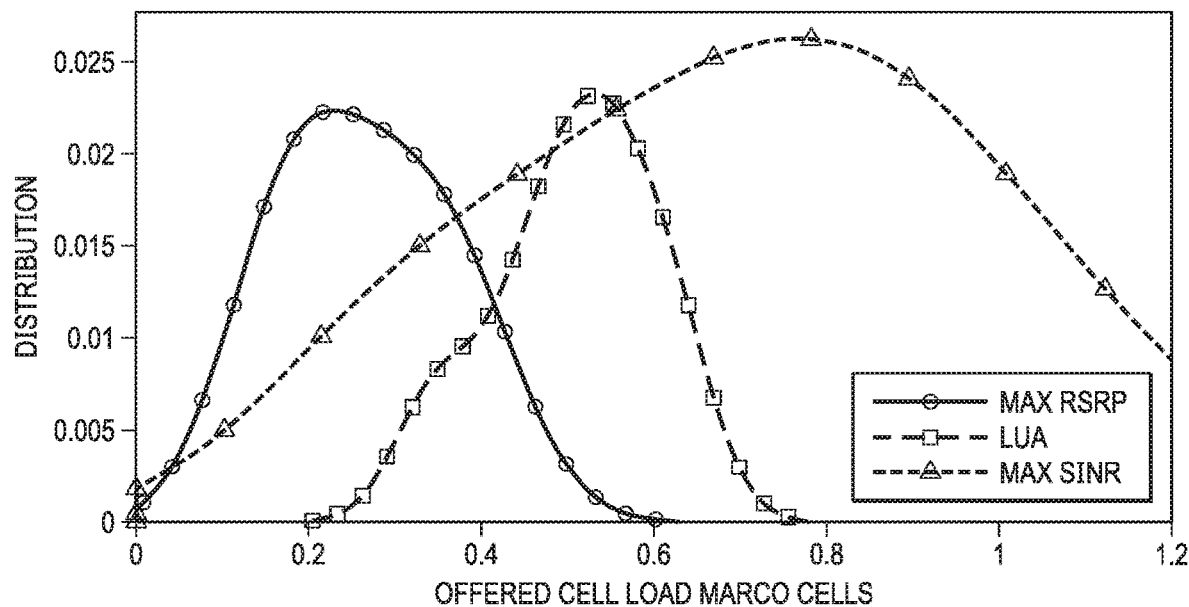
FIG. 8 shows results of a comparison of Offered Macro Cell Load Distribution for LUA vs. Max RSRP and Max SINR user association.

The results in FIG. 7 show that the load-aware user association manages to keep small cell loads within 80%, max RSRP keeps small cell loads to within 60%, and max SINR association overloads a number of small cells due to their stronger signals. In comparison, FIG. 8 shows that the load-aware user association technique attempts to distribute load evenly between macro and small cells, with only a few small cells marginally overloaded. On the other hand, due to a lack of load awareness, both max RSRP and max SINR association overload the macro cells with more than half the macro cells overloaded. The even load distribution offered by the load-aware user association methodology also results in fewer unsatisfied users, i.e., users who are unable to achieve their desired throughput due to a lack of physical resources at the serving cell.

Figure 9:
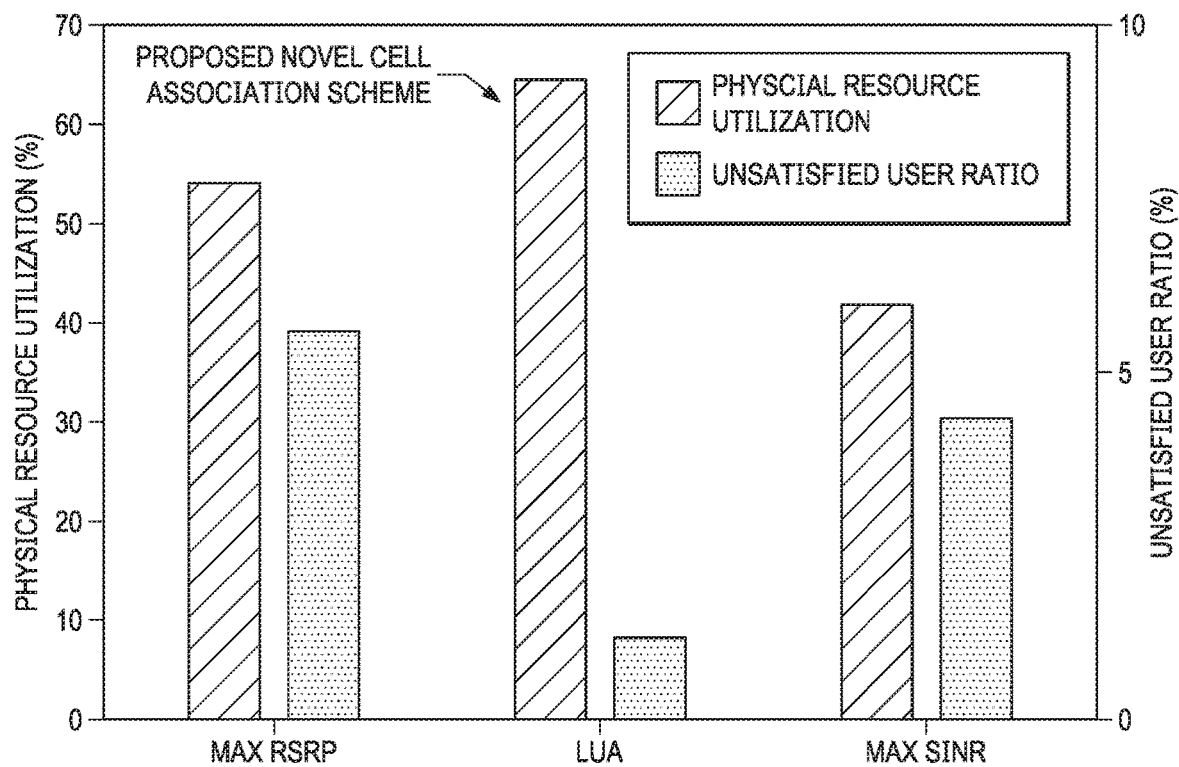
FIG. 9 shows results of a comparison of network utilization and unsatisfied user ratio for LUA vs. Max RSRP and Max SINR user association.

This is evidenced by the ratio of unsatisfied users in the network and the utilization of physical resources in the network given in FIG. 9. While the load-aware user association occupies more resources, it is able to minimize the ratio of unsatisfied users by evenly distributing the load between cells. On the other hand, the max RSRP and max SINR user association schemes are oblivious to the needs of the users and blindly associate them with cells offering best coverage and quality. This leads to cells becoming overloaded and a higher ratio of unsatisfied users. The results in FIGS. 7-9 also demonstrate that the flexibility in the design of the proposed load-aware user association scheme allows it to be an effective coverage, capacity, and load optimization solution, even when deployed independently in a cellular network.

Figure 10:
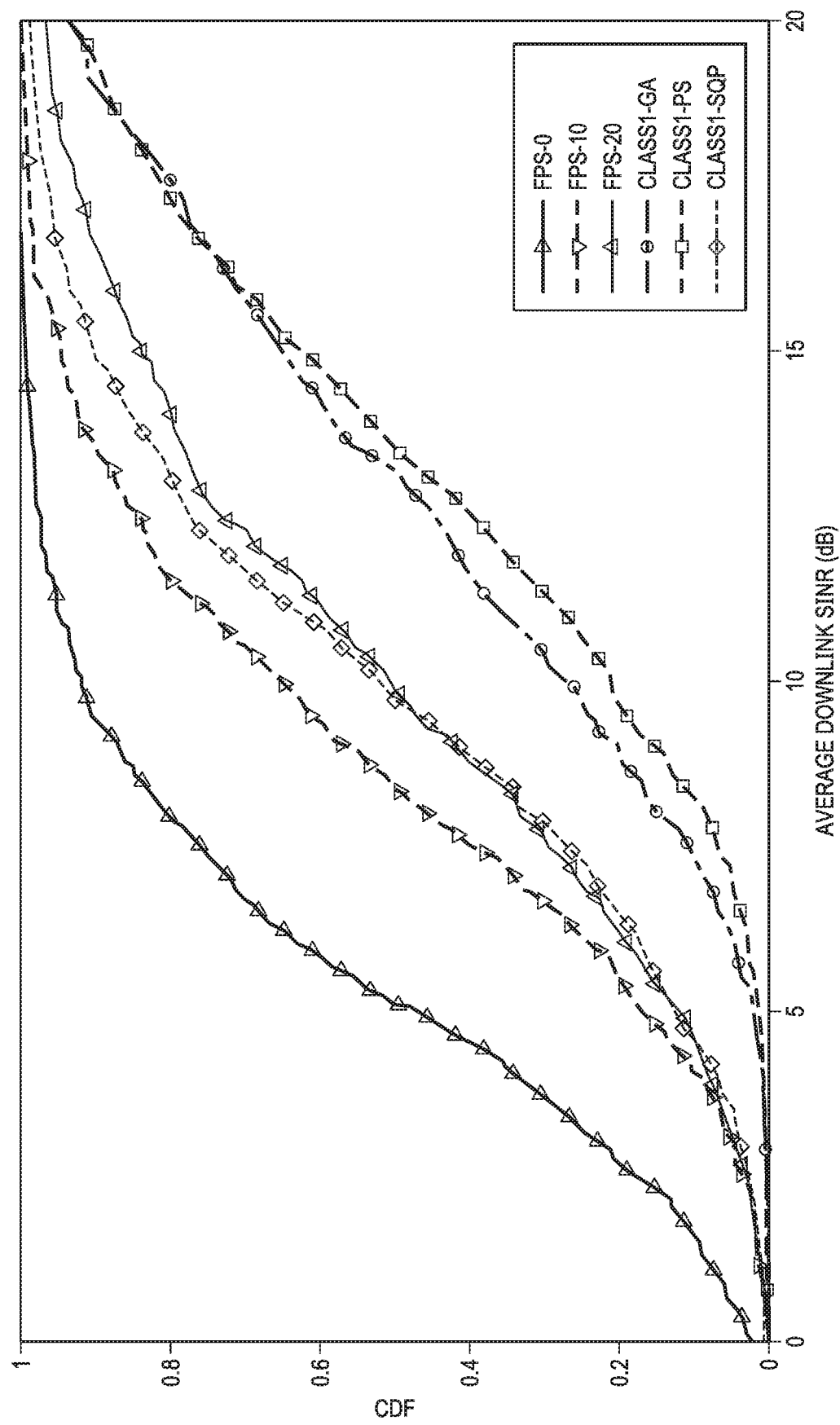
FIG. 10 shows results of a comparison of downlink SINR combined distribution frame (CDF)—FPSs vs. CLASS1-genetic algorithm (GA), pattern search (PS) and SQP.
Figure 11:
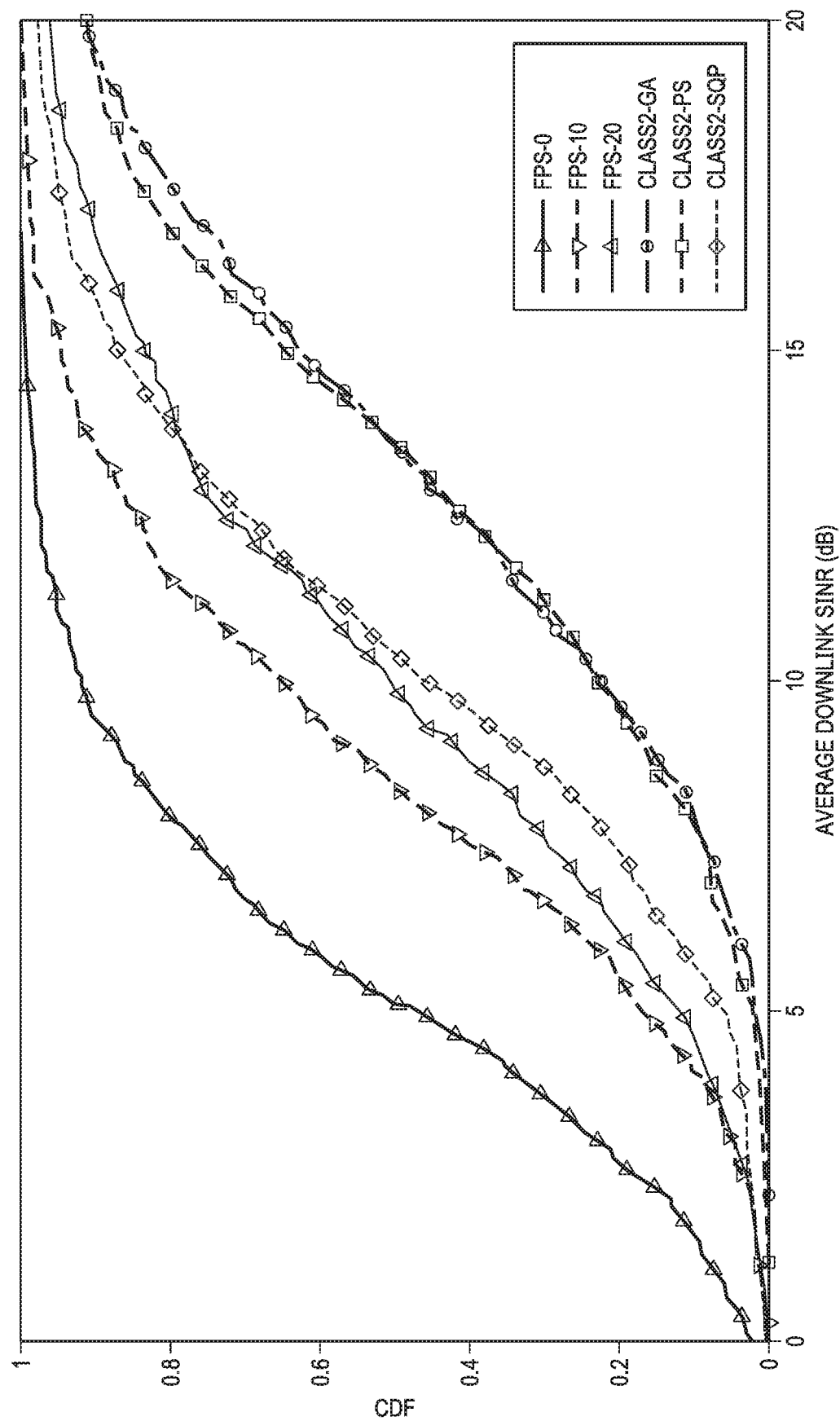
FIG. 11 shows results of a comparison of downlink SINR CDF—FPSs vs. CLASS2-genetic algorithm (GA), pattern search (PS) and SQP.

Comparative Analysis of Solutions:

Downlink SINR: To compare the performance of the two CLASS formulations, downlink SINR is used as the benchmark performance indicator. FIG. 10 compares the results for CLASS1 obtained using SQP, genetic algorithm, and pattern search against different FPSs defined in Table 2. The results show that 50th percentile users achieve 14 dB SINR with CLASS1-PS compared to 10 dB for top-performing FPS-20. In FIG. 11, the same comparison is presented for CLASS2, which shows that 50th percentile users achieve 4.5 dB higher SINR with CLASS2 compared to FPS-20. Using CIOs alone for LB has negative impact on SINR. But when CIOs are adapted through the disclosed load-aware user association in conjunction with transmit power and antenna tilts, a gain in SINR is still achieved. This rationalizes the need to include all three optimization parameters in the disclosed CCO-LB solution, compared to prior work, which used one or two parameters at a time. Another result to point out here is that the solutions obtained using genetic algorithm and pattern search perform better for both CLASS1 and CLASS2 compared to SQP. This is due to the fact that the genetic algorithm and pattern search attempt to find the global optimum, whereas SQP is a gradient-driven process that is vulnerable to convergence to local extrema.

Figure 12:
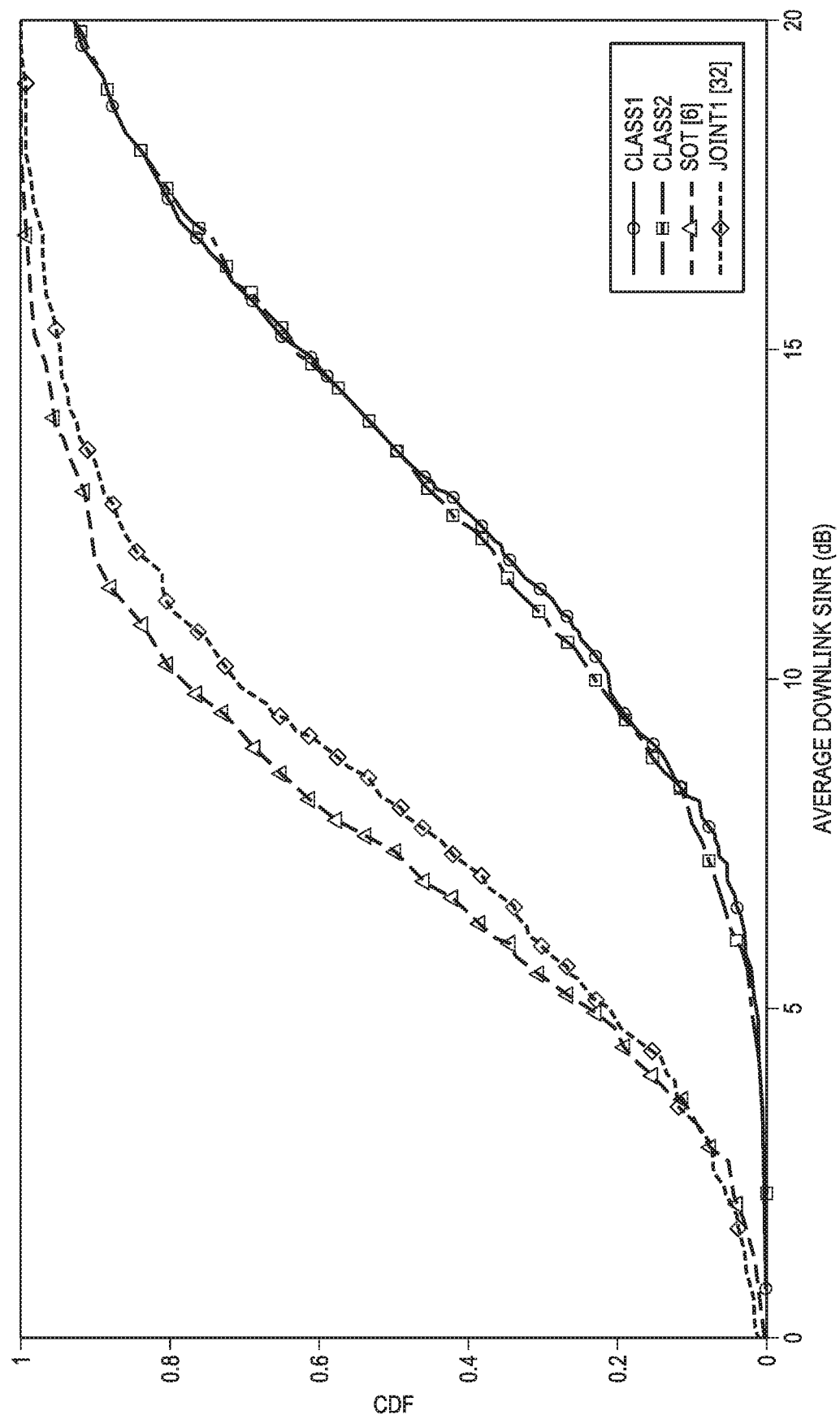
FIG. 12 shows results of a comparison of downlink SINR CDF—secure overlay tree (SOT) and JOINT1 vs. CLASS1 and CLASS2.

FIG. 12 compares the best solution obtained for CLASS1 (pattern search) and CLASS2 (genetic algorithm) against a CCO algorithm proposed in Imran referred to therein as SOT, and a CCO-LB algorithm JOINT1 presented in Fehske. Results in FIG. 12 show that CLASS1 and CLASS2 offer SINR>10 dB for almost 80% of users. In comparison, with SOT and JOINT1, only 20% and 30% of users have SINR above 10 dB, respectively. CLASS1 performs slightly better compared to CLASS2 for cell edge users i.e., the lower half of users with CLASS2, giving slightly better performance for the top half. This is because of the use of geometric mean in CLASS1, which forces fairness in all user throughputs, whereas the use of arithmetic mean attempts to maximize the extreme throughput values.

Figure 13:
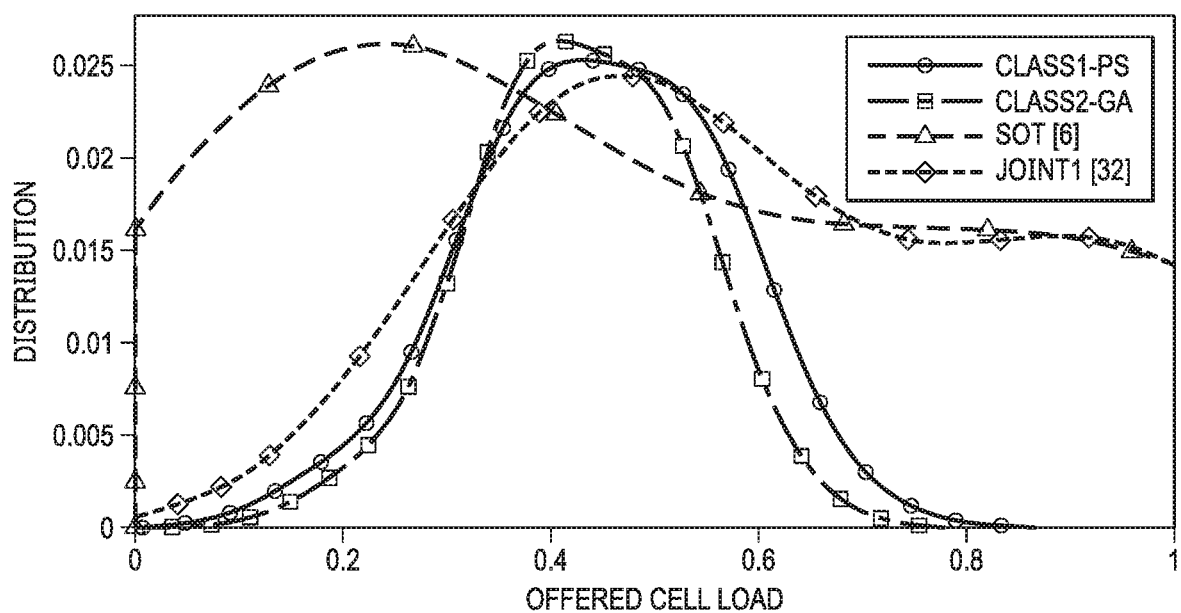
FIG. 13 shows results of a comparison of Offered Cell Load Distribution—SOT and JOINT1 vs. CLASS1 and CLASS2.

Offered Cell Load:

FIG. 13 compares offered cell loads for CLASS1, CLASS2, SOT, and JOINT1. The results show that the cell loads range from 10% to 80% for CLASS1 and from 10% to 70% for CLASS2. This difference is due to the higher focus of CLASS1 on fairness, which means it attempts to increase throughput of low SINR users by allocating them more resources compared to CLASS2, which focuses only on maximizing total throughput. By comparison, SOT shows the widest disparity among cell loads. This is primarily due to the fact that SOT is a CCO-only algorithm that only optimizes antenna tilts, thus highlighting the importance of formulating LB and CCO jointly with all three parameters. JOINT1 being a CCO-LB solution that incorporates two parameters, i.e., antenna tilts and CIOs, offers better load balancing compared to SOT, but is still significantly outperformed by both CLASS1 and CLASS2.

Figure 14:
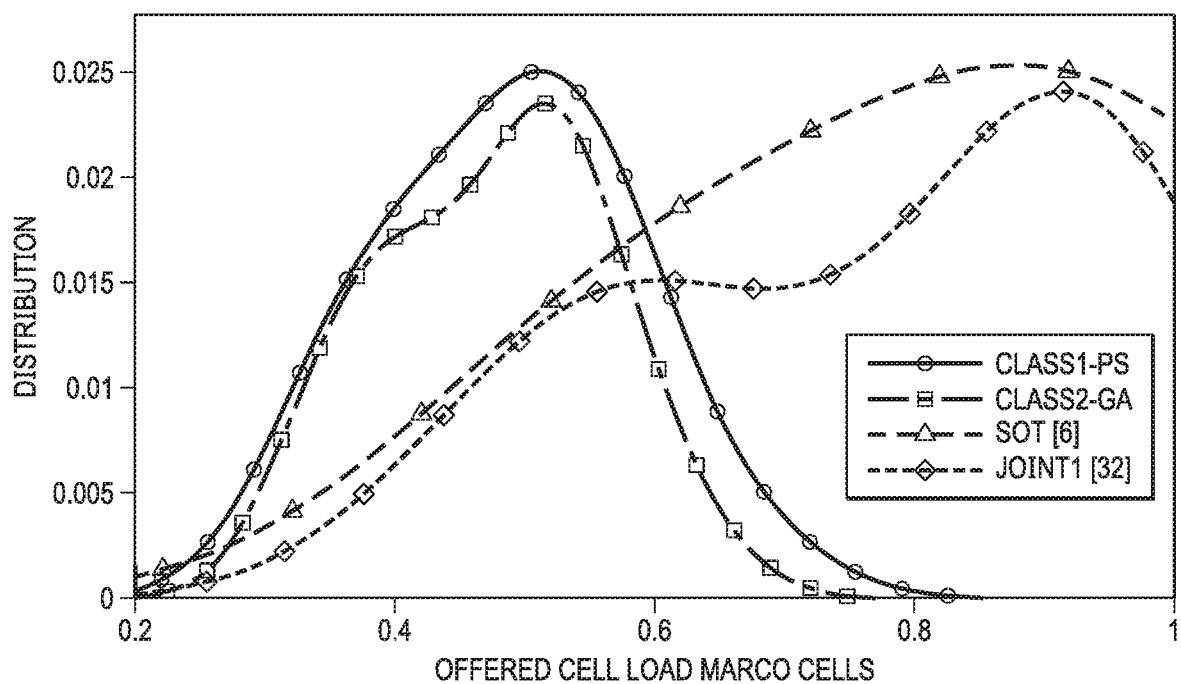
FIG. 14 shows results of a comparison of Offered Macro Cell Load Distribution—SOT and JOINT1 vs. CLASS1 and CLASS2.
Figure 15:
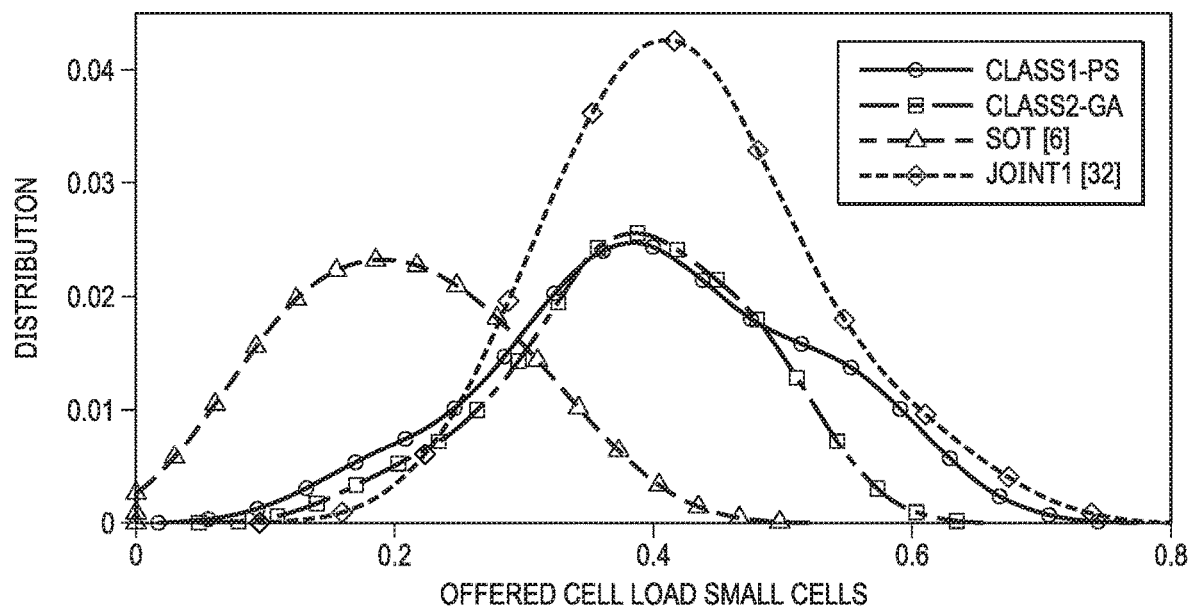
FIG. 15 shows results of a comparison of Offered Small Cell Load Distribution—SOT and JOINT1 vs. CLASS1 and CLASS2

FIGS. 14-15 show the performance of the disclosed CCO-LB solution in terms of LB and QoS by showing load distributions for macro and small cells separately. While none of the macro or small cells is overloaded by the CLASS solutions, SOT heavily favors macro cells over small cells for loading causing almost 50% of the macro cells to become overloaded. Similarly, since JOINT1 optimizes only CIOs and antenna tilts, it also favors macro cells for load bearing over small cells. Another key insight here is that, contrary to earlier load balancing schemes, the solution disclosed herein not only balances loads between macro cells and small cells, but increases capacity in the system by jointly optimizing soft and hard parameters, thereby satisfying CCO objective at the same time.

Figure 16:
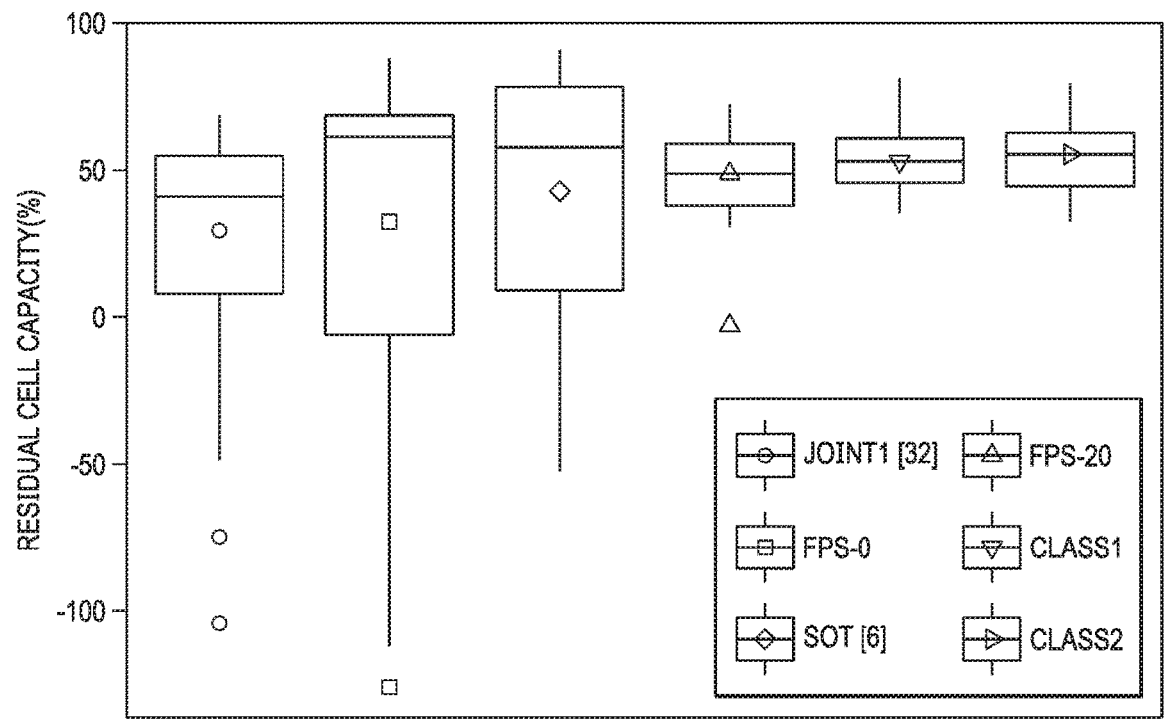
FIG. 16 shows results of a comparison of Residual Cell Capacity—FPS-0, FPS-20, SOT and JOINT1 vs. CLASS1 and CLASS2.

This is further put into perspective when observing the residual cell capacity across the network, as shown in FIG. 16. The box plots show the median residual capacity value along with the distance between first and third quartiles, whereas the points inside the box plots signify the mean residual capacity. The average residual cell capacity of the proposed CLASS1 and CLASS2 solutions are 54.8% and 55.5%, respectively, which is 20% more than the average residual capacity of the SOT algorithm of Imran and over 45% more than the residual capacity of the JOINT1 algorithm in Fehske. However, a key observation in FIG. 16 is compactness of the first and third quartile, and the outer fences for CLASS solutions compared to the residual capacities of other solutions. The increased residual capacity creates additional space for transit users within each cell, a feature that is highly desirable in ultra-dense HetNets due to the expected high user mobility.

Figure 17:
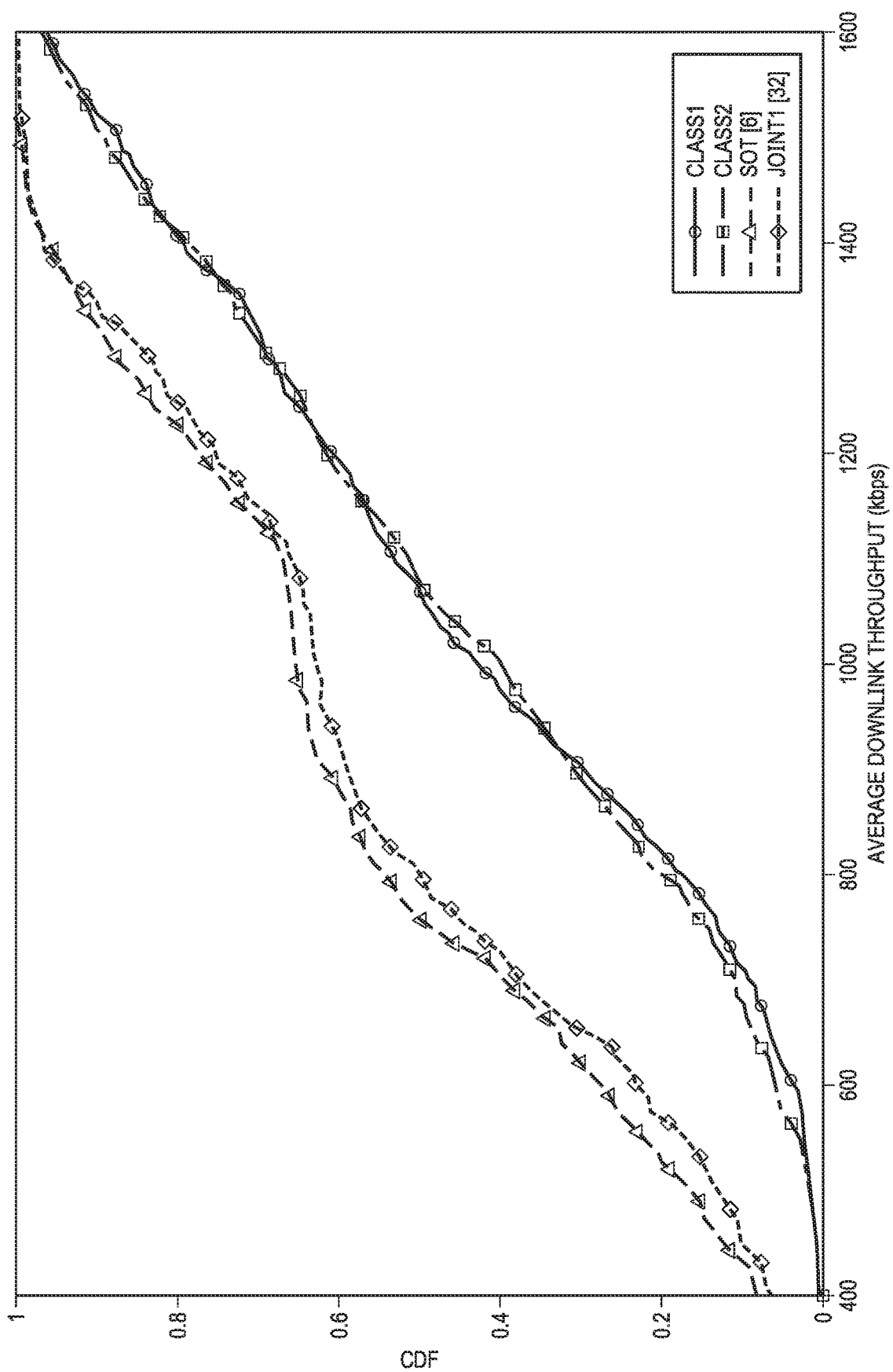
FIG. 17 shows results of a comparison of Downlink Throughput CDF—SOT and JOINT1 vs. CLASS1 and CLASS2.

Downlink User Throughout:

FIG. 17 plots the average downlink user throughput CDF for all the users in the network with CLASS1, CLASS2, SOT, and JOINT1. There is a significant gain in user throughput for CLASS1 and CLASS2 compared to both SOT and JOINT1. The observed gain in throughput offered by CLASS solutions is despite the fact desired user throughputs are pre-set and that PRBs are allocated to each user based on that requirement. The observed gain in throughput occurs due to the user SINR at the time of cell association in calculation of PRBs required to serve a user. The same PRBs later result in better throughput for the user when the user SINR improves as a result of the parameter optimization by the disclosed solution. In a real system, this throughput increase beyond a desired user throughput can be controlled by doing SINR calculations more frequently, e.g., using CQI reports.

Figure 18:
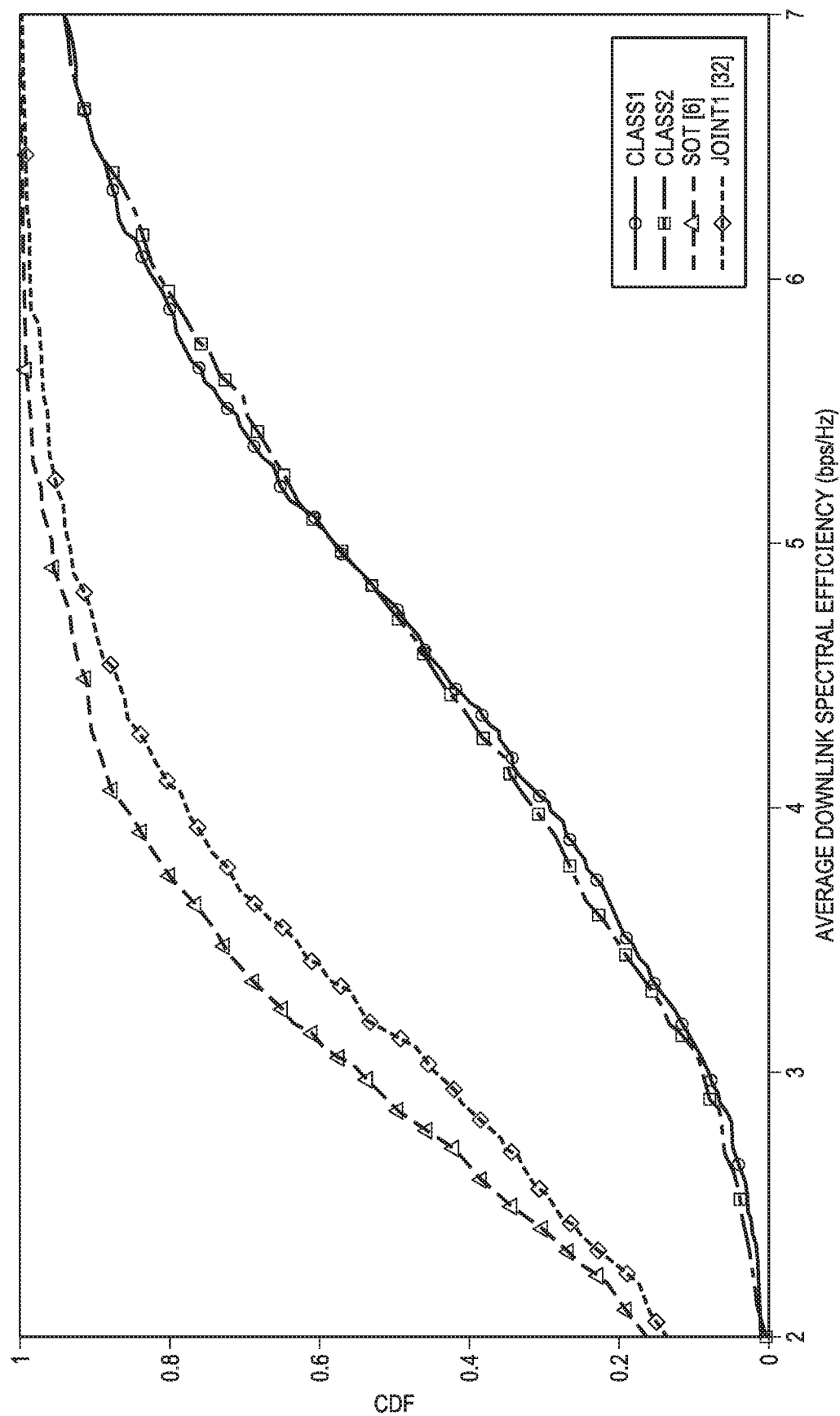
FIG. 18 shows results of a comparison of Downlink Spectral Efficiency CDF—SOT and JOINT1 vs. CLASS1 and CLASS2.

Downlink Spectral Efficiency:

FIG. 18 shows the CDF for downlink spectral efficiency in the network. CLASS solutions provide the highest spectral efficiency. As spectral efficiency is a function of throughput, the same logic as for user throughput applies here, too. However, the impact of SINR on spectral efficiency is also visible with the plot for spectral efficiency following a similar trend as SINR.

Performance Analysis of the CLASS Solutions

The complexity of the CLASS solution depends on two factors: 1) the execution time of algorithm 1 and 2) the execution time of the optimization algorithm. The execution time of algorithm 1 comes out to be $O(|\mathbb{U}|+2|\mathbb{C}|+2|\mathbb{U}|\|\mathbb{C}|)$, which can be generalized as $O(|\mathbb{U}|\|\mathbb{C}|)$. This means that the runtime of algorithm 1 increases linearly with an increase in the number of users $|\mathbb{U}|$ and cells $|\mathbb{C}|$. Any additional execution time depends on the optimization algorithm being used. Assuming genetic algorithm is used to optimize the cell parameters, its execution time can be obtained from Randy L. Haupt, et al., "Practical Genetic Algorithms," Wiley-Interscience, 2004, which is incorporated by reference. Specifically, the execution time is $O(GP)$.

Figure 19:
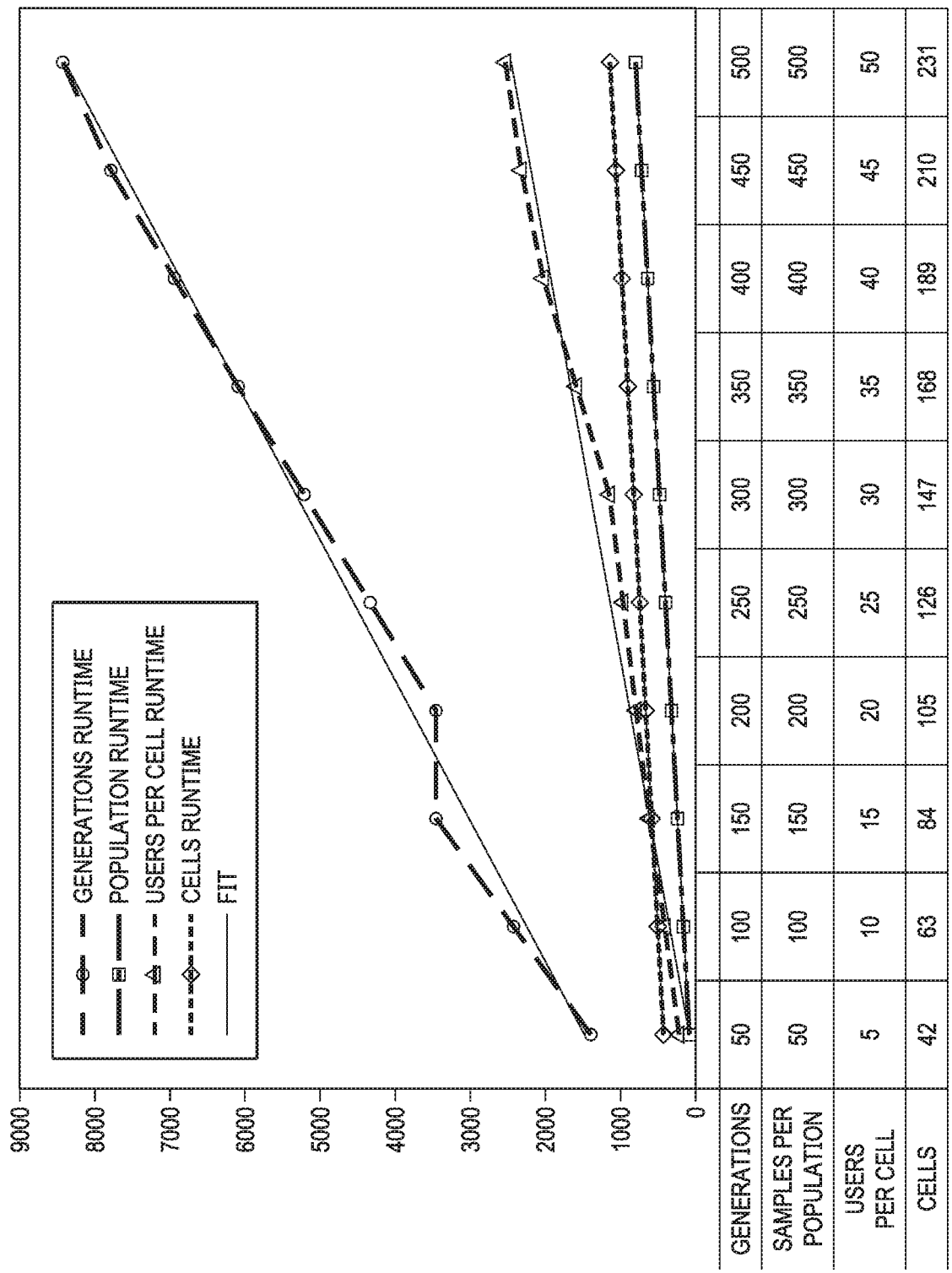
FIG. 19 shows results of a comparison of Actual vs. Fitted Runtimes for CLASS algorithms for different values of generations (G), population (P), users ($|\mathbb{U}|$), and cells ($|\mathbb{C}|$).

Thus, the total runtime of the solution is $O(GP|\mathbb{U}|\|\mathbb{C}|)$, which is linear in all four variables. This is also demonstrated in FIG. 19, which shows the experimental algorithm runtimes for varying values of G; P; $|\mathbb{U}|$, and $|\mathbb{C}|$. Given the computational powers of current network controllers, this execution time is easily manageable. Furthermore, network operators can use big data analytics to predict cell loads and obtain optimal parameters proactively to minimize the impact of computation delay on subscriber QoE. Apart from this, the implementation of the disclosed load-aware user association requires one additional multiplication step on top of calculating RSRP(+CIO) for each user equipment (UE). This, given the capabilities of today's smartphones, is not a significant computational burden.

Practical Implementation of Disclosed CLASS Solutions in Current and Future Mobile Cellular Networks:

To implement CLASS solutions in an operational network, idle (disconnected) users must be informed about cell loads at the time of association, whereas association decision for active (connected) users will be made by the network based on user measurement reports and cell load data. Current networks have this information in the form of total PRB usage that can act as a proxy for cell load until a tailor-made measurement is made available in future standards to implement CCO and LB.

Also, to successfully balance cell loads across the network, it helps to generate and leverage user traffic prediction models. Most existing operators already construct some form of this model on their own. Current standardization includes a traffic classification parameter called "number of active users in the DL per QCI". This measure can act as a proxy for expected data rate or QoS requirements until a custom measurement to facilitate CCO-LB and other SON functions that can benefit from intelligence of QoS expectations is standardized for future networks.

Moreover, the present disclosure considers the same maximum load threshold $th^c=100\%$ for all cells. However, in real networks and in advanced implementation of the disclosed CCO-LB, setting individual cell load thresholds can be useful in scenarios where different cells are known to have different user arrival rates, sojourn times, and traffic statistics. This can also be useful where the power consumption models of the BS in different cells are different and loading points that return optimal energy efficiency in individual cells are different.

Figure 20:
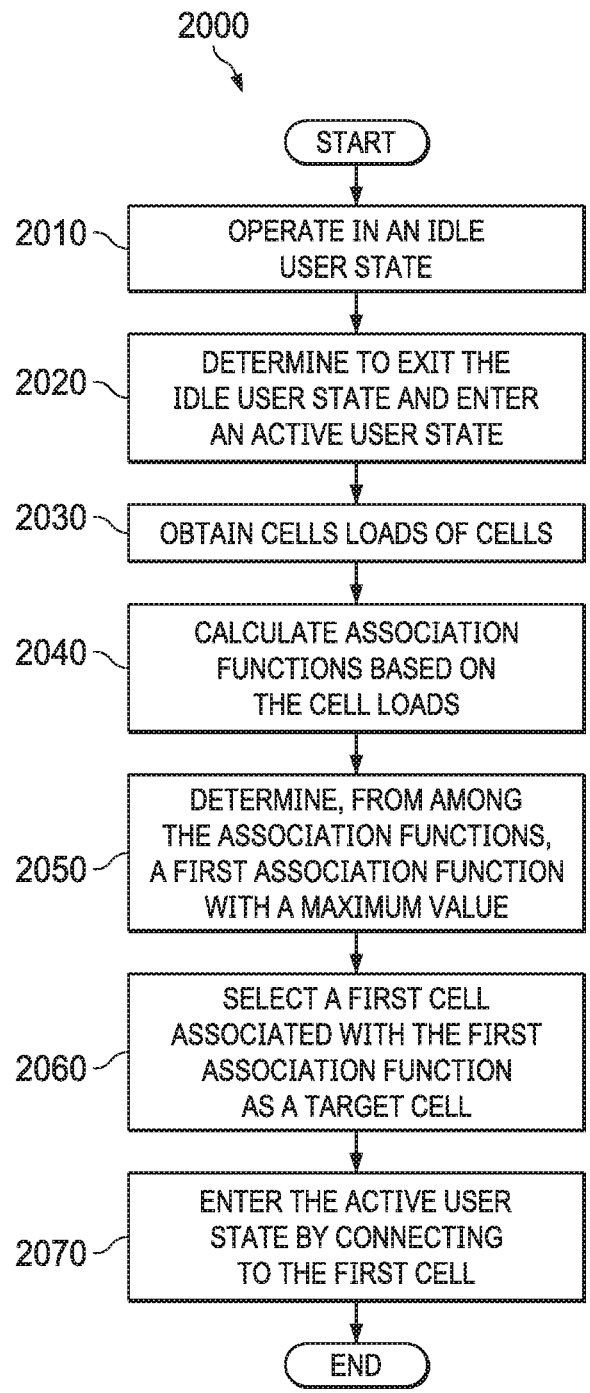
FIG. 20 is a flowchart illustrating a method of LUA according to a first embodiment of the disclosure.

FIG. 20 is a flowchart illustrating a method 2000 of LUA according to a first embodiment of the disclosure. A UE may implement the method 2000. At step 2010, operation in an idle user state occurs. At step 2020, it is determined to exit the idle user state and enter an active user state. At step 2030, cell loads of cells are obtained. For instance, base stations of the cells calculate the cells loads according to equation (3) and transmit the cells loads to the UE. At step 2040, association functions based on the cell loads are calculated. For instance, the UE calculates the association functions according to equation (11). At step 2050, from among the association functions, a first association function with a maximum value is determined. Alternatively, the first association function has a minimum value or another value indicating an optimized choice. At step 2060, a first cell associated with the first association function is selected as a target cell. Finally, at step 2070, the active user state is entered by connecting to the first cell.

The cell loads may be ratios of a number of PRBs occupied in a cell during a transmission time interval to a total number of PRBs available in the cell. The method 2000 may further comprise obtaining RSRPs from the cells and further calculating the association functions based on the RSRPs. The RSRPs may be linear averages of reference signal powers measured divided by specified bandwidths. The method 2000 may further comprise obtaining power consumption statuses from the cells and further calculating the association functions based on the power consumption statuses. The power consumption statuses may indicate how much power base stations associated with the cells consume in a period of time. The method 2000 may further comprise obtaining a mobility profile of the UE and further calculating the association functions based on the mobility profile. The mobility profile may indicate a physical movement speed of a UE.

Figure 21:
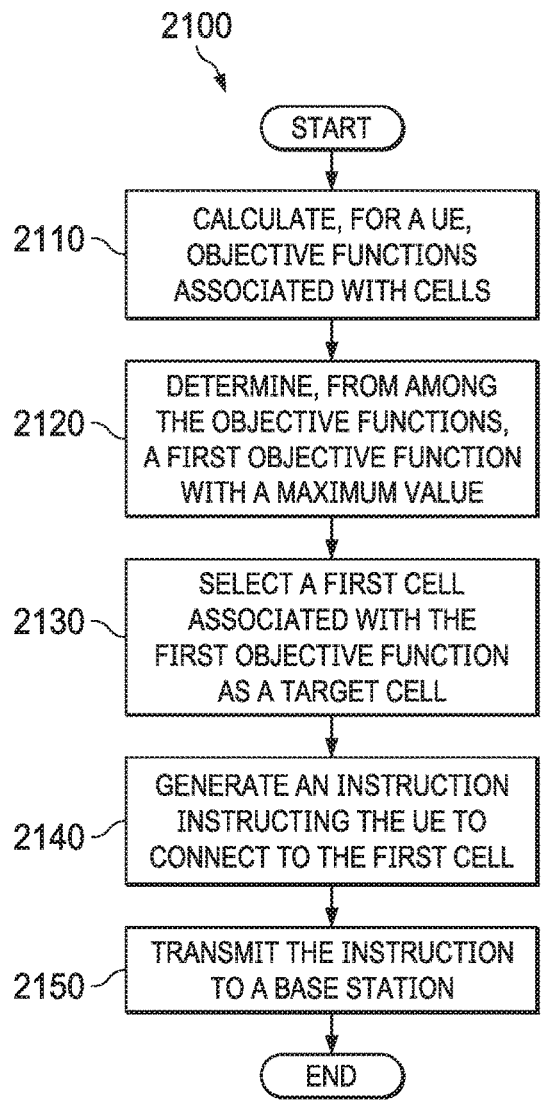
FIG. 21 is a flowchart illustrating a method of LUA according to a second embodiment of the disclosure.

FIG. 21 is a flowchart illustrating a method 2100 of LUA according to a second embodiment of the disclosure. A centralized SON controller may implement the method 2100. At step 2110, objective functions associated with cells are calculated. The objective functions are based on an antenna tilt, a transmit power, and a CIO. Previous approaches did not combine those criteria because doing so increased computational requirements. However, the proposed method resolves conflict between CCO and LB SON functions and allows them to act jointly to optimize performance of a heterogeneous cellular network without significant computational overhead compared to heuristic approaches. The performance of the proposed method in comparison to existing parameter setting techniques shows that the joint formulation is significantly superior in terms of common network evaluation KPIs which justify additional computational overhead. Given the basis of development, the impact of the joint formulation can have significant impact on future studies and SON function developments.

At step 2120, from among the objective functions, a first objective function with a maximum value is determined. Alternatively, the first objective function has a minimum value or another value indicating an optimized choice. At step 2130, a first cell associated with the first objective function is selected as a target cell. At step 2140, an instruction instructing the UE to connect to the first cell is generated. Finally, at step 2150, the instruction is transmitted to the base station.

The base station may be associated with the first cell. The antenna tilt may be an angle between a direction of a main beam of a base station and a horizon. The transmit power may be an average transmit power of a base station in a period of time. The CIO may be a virtual offset in the transmit power of the serving cell or any combination of parameters that virtually increase the transmit power of the serving cell.

Figure 22:
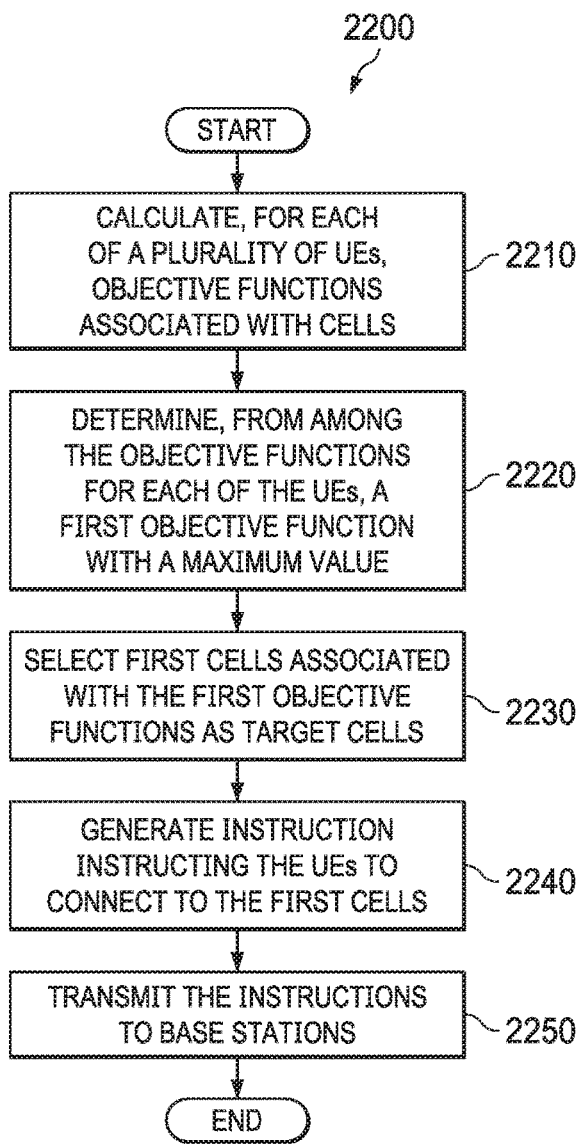
FIG. 22 is a flowchart illustrating a method of LUA according to a third embodiment of the disclosure.

FIG. 22 is a flowchart illustrating a method 2200 of LUA according to a third embodiment of the disclosure. A centralized SON controller may implement the method 2200. At step 2210, for each of a plurality of UEs, objective functions are calculated. The UEs have a same CIO. The CIO may be a virtual offset in the transmit power of the serving cell or any combination of parameters that virtually increases the transmit power of the serving cell. The objective functions are based on an antenna tilt, a transmit power, and a UIO. The UIO is a virtual offset in the power received by a user or any combination of parameters that virtually increases the power received by a user. Each UE may have a different UIO. At step 2220, from among the objective functions for each of the UEs, a first objective function with a maximum value is determined. Alternatively, the first objective function has a minimum value or another value indicating an optimized choice. At step 2230, first cells associated with the first objective functions are selected as target cells. At step 2240, instructions instructing the UEs to connect to the first cells are generated. Finally, at step 2250, the instructions are transmitted to base stations.

Figure 23:
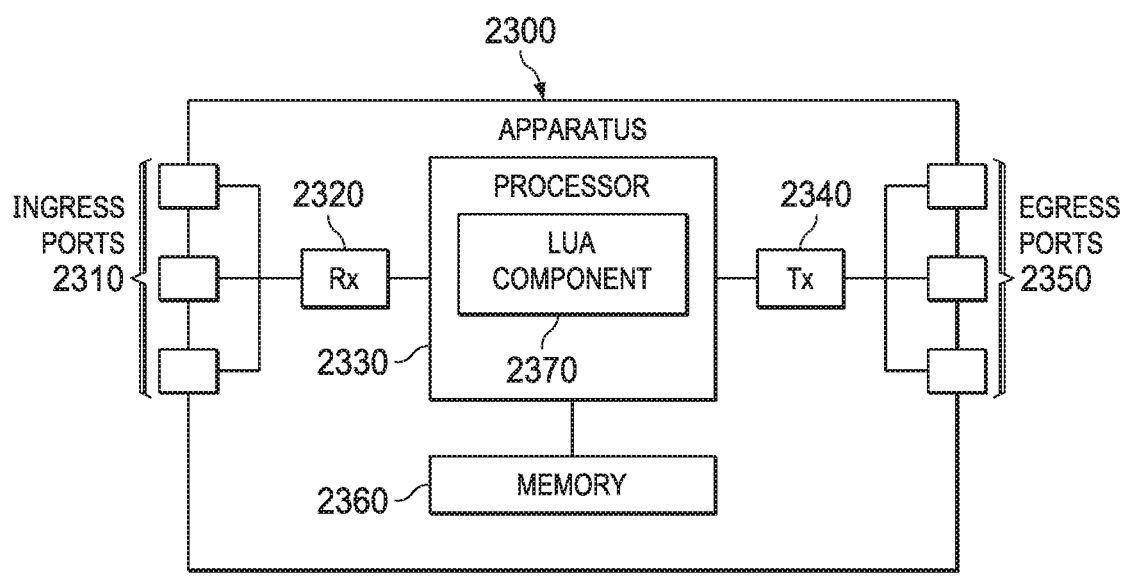
FIG. 23 is a schematic diagram of an apparatus according to an embodiment of the disclosure.

FIG. 23 is a schematic diagram of an apparatus 2300 according to an embodiment of the disclosure. The apparatus 2300 may implement the disclosed embodiments. The apparatus 2300 comprises ingress ports 2310 and a receiver unit (RX) 2320 to receive data; a processor, logic unit, baseband unit, or central processing unit (CPU) 2330 to process the data; a transmitter unit (TX) 2340 and egress ports 2350 to transmit the data; and a memory 2360 to store the data. The apparatus 2300 may also comprise optical-to-electrical (OE) components, electrical-to-optical (EO) components, or radio frequency (RF) components coupled to the ingress ports 2310, the RX 2320, the TX 2340, and the egress ports 2350 to provide ingress or egress of optical signals, electrical signals, or RF signals.

The processor 2330 is any combination of hardware, middleware, firmware, or software. The processor 2330 comprises any combination of one or more CPU chips, cores, field-programmable gate arrays (FPGAs), application-specific integrated circuits (ASICs), or digital signal processors (DSPs). The processor 2330 communicates with the ingress ports 2310, the RX 2320, the TX 2340, the egress ports 2350, and the memory 2360. The processor 2330 comprises an LUA component 2370, which implements the disclosed embodiments. The inclusion of the LUA component 2370 therefore provides a substantial improvement to the functionality of the apparatus 2300 and effects a transformation of the apparatus 2300 to a different state. Alternatively, the memory 2360 stores the LUA component 2370 as instructions, and the processor 2330 executes those instructions.

The memory 2360 comprises any combination of disks, tape drives, or solid-state drives. The apparatus 2300 may use the memory 2360 as an over-flow data storage device to store programs when the apparatus 2300 selects those programs for execution and to store instructions and data that the apparatus 2300 reads during execution of those programs, for instance as a computer program product. The memory 2360 may be volatile or non-volatile and may be any combination of read-only memory (ROM), random-access memory (RAM), ternary content-addressable memory (TCAM), or static RAM (SRAM).

In conclusion, the present disclosure describes a framework for joint CCO and LB SON functions with transmit powers, antenna tilts, and CIOs as the optimization parameters. The disclosed CCO-LB solution (CLASS) not only provides significant gains in terms of downlink SINR and throughput, it also provides balanced distribution of cell loads in a heterogeneous network, which is key to meeting overall resource efficiency demands. The key metrics for quantifying gains for the joint CCO-LB function are not merely user SINR, throughput, or spectral efficiency, but also most importantly the amount of free resources in the network after all users are satisfied, which is called residual capacity. Maximization of residual capacity is the key to achieving temporal stability in the network optimization process due to the acute mobility dynamics of HetNets. Further gain in throughput and spectral efficiency can be obtained by softening the constraint of desired user throughput and by incorporating scheduling level decisions. Nevertheless, CLASS substantially outperforms the comparable algorithms proposed in literature for all KPIs without exception because, unlike prior works: 1) it exploits joint optimization of all three parameters that influence coverage and cell association; thus, in addition to just shifting load, it shifts load in a way that increases overall system capacity; 2) it leverages a smarter load-aware cell association mechanism; and 3) though the objective function targets throughput maximization and thus aims for CCO, the formulation is designed to incorporate LB in the objective function itself through use of a geometric mean. This yields better results compared to solutions that target CCO and take LB as a constraint and vice versa because a goal included as a constraint is likely to yield acceptable but not optimal results. It is also possible to incorporate energy efficiency (EE) and mobility robustness optimization (MRO) SON functions into CLASS by setting the load thresholds for intelligently selected cells to zero based on user mobility and activity profiles.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method comprising:
calculating, for a user equipment (UE), objective functions associated with cells, wherein the objective functions comprise an expression, wherein the expression is based on a value, wherein the value is a signal-to-interference-plus-noise ratio (SINR) and is directly proportional to an antenna tilt, a transmit power, and a cell individual offset (CIO), and wherein the antenna tilt is an angle between a direction of a main beam of a base station and a horizon;

determining, from among the objective functions, a first objective function with a maximum value;

selecting a first cell associated with the first objective function as a target cell;

generating an instruction instructing the UE to connect to the first cell; and transmitting the instruction to a base station.

2. The method of claim 1, wherein the base station is associated with the first cell.

3. The method of claim 1, wherein the transmit power is an average transmit power of a base station in a period of time.

4. The method of claim 1, wherein the CIO is a virtual offset in the transmit power of a serving cell or any combination of parameters that virtually increases the transmit power.

5. The method of claim 1, further comprising further calculating the objective functions without iteration.

6. The method of claim 1, wherein the expression is based on a log of the SINR.

7. A centralized self-organizing network (SON) controller comprising:

a memory;

a processor coupled to the memory and configured to:
calculate, for a user equipment (UE), objective functions associated with cells, wherein the objective functions comprise an expression, wherein the expression is based on a value, wherein the value is a signal-to-interference-plus-noise ratio (SINR) and is directly proportional to an antenna tilt, a transmit power, and a cell individual offset (CIO), and wherein the antenna tilt is an angle between a direction of a main beam of a base station and a horizon, determine, from among the objective functions, a first objective function with a maximum value, select a first cell associated with the first objective function as a target cell, and generate an instruction instructing the UE to connect to the first cell; and a transmitter coupled to the processor and configured to transmit the instruction to a base station.

8. The centralized SON controller of claim 7, wherein the transmit power is an average transmit power of a base station in a period of time.

9. The centralized SON controller of claim 7, wherein the CIO is a virtual offset in a transmit power of a serving cell or any combination of parameters that virtually increases the transmit power of the serving cell.

10. The centralized SON controller of claim 7, wherein the expression is based on a log of the SINR.

11. A method comprising:

calculating, for each of a plurality of user equipments (UEs), objective functions associated with cells, wherein the UEs have a same cell individual offset (CIO), and wherein the objective functions comprise an expression, wherein the expression is based on a value, wherein the value is a signal-to-interference-plus-noise ratio (SINR) and is directly proportional to an antenna tilt and a transmit power, and wherein the objective functions are based on a user individual offset (UIO), and wherein the antenna tilt is an angle between a direction of a main beam of a base station and a horizon;

determining, from among the objective functions for each of the UEs, a first objective function with a maximum value;

selecting first cells associated with the first objective functions as target cells;

generating instructions instructing the UEs to connect to the first cells; and transmitting the instructions to base stations.

12. The method of claim 11, wherein the UIO is a virtual offset in a power received by a user or any combination of parameters that virtually increases the power.

13. The method of claim 11, wherein the transmit power is an average transmit power of a base station in a period of time.

14. The method of claim 11, wherein the CIO is a virtual offset in a transmit power of a serving cell or any combination of parameters that virtually increases the transmit power of the serving cell.

15. The method of claim 11, wherein the expression is based on a log of the SINR.

* * * * *